US012743548B2

(12) United States Patent
Dasher et al.

(10) Patent No.: US 12,743,548 B2
(45) Date of Patent: Sep. 22, 2026

(54) SYSTEMS AND METHODS FOR MANAGING PRIVACY OF ARTIFICIAL INTELLIGENCE TRAINING DATA

(71) Applicant: Adeia Guides Inc., San Jose, CA (US)

(72) Inventors: Charles Dasher, Lawrenceville, GA (US); Mareeta Mathai, San Jose, CA (US); Christopher Phillips, Hartwell, GA (US); Jean-Yves Couleaud, Mission Viejo, CA (US)

(73) Assignee: Adeia Guides Inc., San Jose, CA (US)

( * ) Notice: Subject to any disclaimer, the term of this patent is extended or adjusted under 35 U.S.C. 154(b) by 34 days.

(21) Appl. No.: 18/970,686

(22) Filed: Dec. 5, 2024

(65) Prior Publication Data

US 2026/0161819 A1 Jun. 11, 2026

(51) Int. Cl.

| | |
|---|---|
| ***G06F 21/62*** | (2013.01) |
| ***G06F 11/34*** | (2006.01) |
| ***G06N 20/00*** | (2019.01) |

(52) U.S. Cl.
CPC ...... *G06F 21/6245* (2013.01); *G06F 11/3438* (2013.01); *G06N 20/00* (2019.01)

(58) Field of Classification Search
CPC .. G06F 21/6245; G06F 11/3438; G06N 20/00
See application file for complete search history.

(56) References Cited

U.S. PATENT DOCUMENTS 12,488,140 B2 * 12/2025 Wang ..................... G06N 3/098
2019/0385043 A1 * 12/2019 Choudhary ......... G06F 13/4239
2023/0073235 A1 3/2023 Wang

OTHER PUBLICATIONS

"App intent domains", Apple Developer Documentation, Retrieved on Dec. 16, 2024, pp. 1-7, Retrieved from https://developer.apple.com/documentation/appintents/app-intent-domains.
"EU Artificial Intelligence Act up to date develoments and analyses of the EU AI Act", EU Artificial Intelligence Act, Retrieved on Dec. 16, 2024, pp. 1-10, Retrieved from https://artificialintelligenceact.eu/.
"The Rise of Machine Unlearning", by the Pecan Team, Jun. 25, 2024, pp. 1-13, Retrieved from https://www.pecan.ai/blog/the-rise-of-machine-Unlearning/.
"What is GDPR, the EU's New data Protection law?", GDPR.EU, Retrieved on Dec. 16, 2024, pp. 1-6, Retrieved from https://gdpr.eu/what-is-gdpr/.

(Continued)

*Primary Examiner* — Baotran N To
(74) *Attorney, Agent, or Firm* — HG LAW LLP

(57) ABSTRACT

Systems and methods are disclosed herein for protecting and managing usage of user data for artificial intelligence (AI) model training. More particularly, systems and related methods are disclosed for collecting user data by tracking interactions with a user interface of a user device in accordance with user defined consent parameters. Further, the collected data may be stored in a training database and leveraged to train an AI model for the user. However, upon receiving an input to delete data from the training database, either explicitly or from deleting an application installed on (or otherwise accessed via) a user device, the data may be removed from the training database and new AI model weights are calculated and provided to the AI model to fine tune the AI model.

20 Claims, 11 Drawing Sheets

(56) References Cited

OTHER PUBLICATIONS

Kiran, S., “Machine Unlearning: A forward leap towards Responsible AI,” Medium, available online at <https://medium.com/@shashikiran_93733/machine-unlearning-a-forward-leap-towards-responsible-ai-7d905a5f09d6>, Feb. 9, 2024, 19 pages.

Snaith, B., et al., “Policy intervention 1: Increase transparency around the data used to train AI models,” Open Data Institute, available online at <https://theodi.org/news-and-events/blog/policy-intervention-1-increase-transparency-around-the-data-used-to-train-ai-models/>, Jun. 11, 2024, 9 pages.

* cited by examiner

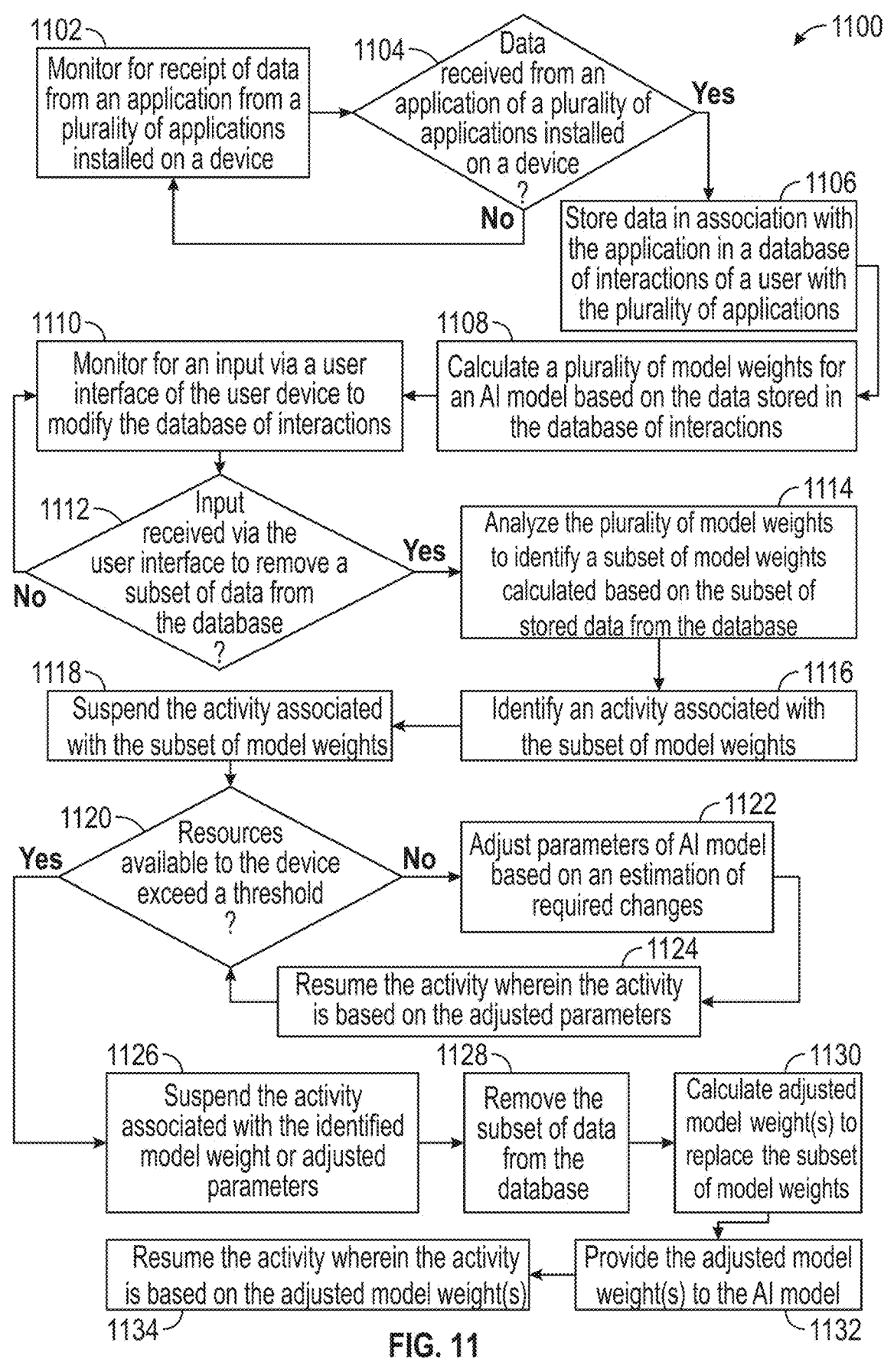

1100

1102 Monitor for receipt of data from an application from a plurality of applications installed on a device 1104 Data received from an application of a plurality of applications installed on a device?

Yes

No

1106 Store data in association with the application in a database of interactions of a user with the plurality of applications 1108 Calculate a plurality of model weights for an AI model based on the data stored in the database of interactions 1110 Monitor for an input via a user interface of the user device to modify the database of interactions 1112 Input received via the user interface to remove a subset of data from the database?

Yes

No

1114 Analyze the plurality of model weights to identify a subset of model weights calculated based on the subset of stored data from the database 1116 Identify an activity associated with the subset of model weights 1118 Suspend the activity associated with the subset of model weights 1120 Resources available to the device exceed a threshold?

Yes

No

1122 Adjust parameters of AI model based on an estimation of required changes

1124 Resume the activity wherein the activity is based on the adjusted parameters 1126 Suspend the activity associated with the identified model weight or adjusted parameters 1128 Remove the subset of data from the database 1130 Calculate adjusted model weight(s) to replace the subset of model weights 1132 Provide the adjusted model weight(s) to the AI model 1134 Resume the activity wherein the activity is based on the adjusted model weight(s)

FIG. 11

SYSTEMS AND METHODS FOR MANAGING PRIVACY OF ARTIFICIAL INTELLIGENCE TRAINING DATA

BACKGROUND

This disclosure is related to techniques for protecting and managing usage of user data, such as in the context of using user data in artificial intelligence (AI) training processes within operating systems (OSs).

SUMMARY

AI models are generally trained through a process that involves feeding them large sets of data and adjusting their internal parameters to recognize patterns, make predictions, or perform specific tasks. Obtaining the data for training AI models often involves sourcing vast amounts of high-quality, relevant information. Currently, training data may be sourced from various origins such as publicly available datasets, crowdsourced content, user-generated content, or company databases. In some approaches, training data is generated by tracking and storing inputs received by users within digital environments, such as search queries or content item selections. Further, these inputs may be stored with additional metadata, such as the time or location corresponding to when the input was received. Systems for training AI models additionally curate and clean the training data, such as by removing errors, balancing categories, and organizing information, enabling the AI model to make accurate predictions and perform well in diverse applications.

As AI technologies become increasingly integrated into devices, there is a need for efficient, user-friendly mechanisms to obtain explicit user consent for the use of the user's data and to manage data privacy. OSs (e.g., mobile OSs) and applications, for instance, heavily rely on user data for AI training to improve their services and features. In one approach, generic consent forms are presented on user devices during app installation or first-time use. However, such approach may not accurately reflect the ongoing nature of data collection and usage, and can lead to inadequate user understanding and engagement, raising privacy concerns and reducing the effectiveness of AI models trained on such data. Further, such approach lacks real-time adaptability and comprehensive privacy measures, resulting in fragmented user experiences and potential privacy risks.

With the advent of data protection legislations, such as the California Consumer Privacy Act (CCPA), General Data Protection Regulation (GDPR) in European Union (EU) law, the EU AI Act, and the proposed AI Foundation Model Transparency Act, there is a need for machine unlearning that accurately and efficiently forgets or removes data from AI models and for better AI transparency and explainability for humans to trust and understand AI systems in devices. In one approach, when users uninstall applications from their devices (e.g., smartphone, laptop, tablet, smart or connected television (TV), wearable device, digital assistant device, and the like), the training data provided by these apps remains on the device, potentially compromising user privacy and the relevance of the AI models. Such AI training data gleaned from the uninstalled application may persist and continue to influence AI model behavior even after the application is removed. Moreover, the data used while the app was installed to train an AI model still has influence on the AI model after the application is uninstalled. This oversight highlights a gap in current data management practices.

The process of AI training presents several challenges, such as optimizing the scheduling of training sessions to minimize disruption, ensuring the security and privacy of user data during transmission and processing, and balancing computational workloads between local devices and cloud servers. In one approach, periodic, bulk data uploads to cloud servers are performed; however, in some circumstances, such an approach can lead to privacy risks, inefficient use of network resources, and decreased battery life.

In another approach, user interfaces provide basic consent management, but such an approach lacks real-time adaptability and user feedback mechanisms and does not fully integrate with user consent and privacy management systems. Additionally, intelligent scheduling of AI training sessions, which considers user habits and real-time activities, is another area needing improvement.

To help address these problems, systems and methods are disclosed herein for removing training data from a database for an AI model, enhancing privacy management of user data in the context of AI or machine learning models, enabling user consent throughout the data collection process, and intelligently managing training of the AI model based on available resources. In some embodiments, the system receives data associated with interactions of a user with a plurality of applications accessed via a device. In some implementations, the system receives select data derived from interactions of a user with a subset of applications. In some embodiments, the system stores the data in a database and subsequently calculates a plurality of model weights for an AI model based at least in part on the stored data. In some implementations, the system, based at least in part on input received via a user interface of the device to remove a subset of the stored data from the database; identifies a subset of model weights from the plurality of model weights, wherein the subset of model weights is associated with the subset of data; modifies the stored data by removing the subset of the stored data from the database, wherein the subset of the stored data is based on interactions of the user with an application of the plurality of applications; and calculates adjusted model weights for the subset of model weights based at least in part on the modified stored data. In some embodiments, the system uses the AI model with the adjusted model weights to provide an output based on input data associated with a subsequent interaction of the user. In some implementations, the system receives and stores data associated with interactions of a user with a particular application, calculates one or more particular model weights based on the stored data, receives input to remove, and subsequently removes, a subset of the stored data based on interactions of the user with the particular application, and calculates one or more adjusted model weights to replace the one or more particular model weights based on the modified stored data.

Such systems and methods, for example, provide a comprehensive approach for: consensually, ethically, and safely obtaining user data; intelligently leveraging the obtained data to train an AI model by accounting for resource availability and user behavior; modifying training data based on received user inputs; and retraining the AI model based on the modified training data. Thus, the AI training system increases user privacy and control of data collection, and effectively utilizes available resources thereby saving both energy (e.g., computing resources and/or battery life) and bandwidth while improving the accuracy and efficiency of AI models.

In some embodiments, the disclosed systems and methods provide a comprehensive system aimed at improving user consent management, data privacy, and AI training processes within OSs, such as, for example, mobile OSs like Android and iOS, or any other suitable OS for any other suitable computing device that is capable of deriving or using user data (e.g., OS for computers, such as, for example, Windows OS, Linux OS, or Mac OS; OS for Internet of things (IOT) devices; OS for smart or connected TVs; OS for extended reality (XR) devices; OS for wearables; OS for vehicles; OS for digital assistant devices or applications; OS for medical prostheses or medical devices; OS for Bluetooth devices). For example, the disclosed systems and methods may enable third-party applications to add their data to train a base AI model or add fine-tuned weights to a base model within an OS by utilizing a dynamic consent mechanism that allows users to modify their data-sharing preferences in real time, with adjustments based on context or location, and a digital assistant that interacts with users to manage preferences and consent settings dynamically, ensuring that users' preferences are continuously updated and aligned with their current habits and needs.

In some embodiments, applications on a user device contribute real-time training data adhering to predefined AI categories, utilizing structured training templates based on the type of data they collect. These applications provide data that can be processed either locally on the device or in the cloud, allowing the AI model to be dynamically updated with new weights. Additionally, the system ensures that when an application is uninstalled, the associated training data and model weights are deleted, maintaining the integrity of the base model.

In some embodiments, a centralized settings panel within the device OS settings menu allows for the seamless management of user consent. Real-time data collection notifications and detailed logs enhance user transparency and control over their data. A scheduling component leverages historical device usage patterns and real-time activity recognition to optimize the timing of AI training sessions, reducing disruption to the user. Differential privacy techniques anonymize user data before it is used for training, ensuring that individual data points cannot be traced back to specific users. The system may incorporate a hybrid training approach, combining local and cloud computing to balance computational loads and enhance performance. Data fusion techniques and federated learning maintain user privacy while allowing for the aggregation and analysis of data from multiple applications.

Additionally, in some embodiments, the system calculates the plurality of model weights by training the AI model based at least in part on the stored data and calculates the adjusted model weights by performing at least one of fine-tuning or retraining the AI model based at least in part on the modified stored data. In some implementations, the system performs at least one of the training, fine-tuning, or retraining of the AI model at each of the device and a remote server. In some embodiments, the disclosed techniques further comprise determining that an amount of resources available for the device is below a threshold, and, at a later time, based at least in part on determining that the amount of resources available for the device now exceeds the threshold, retraining or fine-tuning the AI model by recalibrating or adjusting one or more model parameters based at least in part on the modified stored data. In some implementations, a respective application of the plurality of applications is associated with a respective data type of a plurality of data types, the plurality of data types respectively correspond to a plurality of training templates, each training template being structured based at least in part on its corresponding data type, the application (associated with the subset of the stored data) is associated with a particular training template and a particular data type, the stored data is organized based at least in part on the plurality of training templates, and the system identifies the subset of the stored data from the database for removal based at least in part on identifying data in the database associated with the particular training template and the particular data type associated with the application.

In some embodiments, the system associates metadata with the stored data, to indicate one or more applications of the plurality of applications to which the stored data was collected in relation to and removes the subset of the stored data from the database based at least in part on the associated metadata. In some implementations, the system maps a plurality of memory regions to the respective model weights, identifies one or more model weights of the calculated model plurality of weights that corresponds to data collected based at least in part on interactions associated with the application and are mapped to one or more memory regions of the plurality of memory regions, and modifies the stored data by removing the mapping between the one or more model weights and the one or more memory regions and deleting the one or more model weights from the stored data. In some embodiments, the system receives additional data associated with one or more interactions of the user with at least one of the plurality of applications, determines whether the additional data matches a portion of the stored data, and based at least in part on determining that the additional data matches a portion of the stored data, refrains from storing the additional data and refrains from using the additional data to calculate the plurality of model weights. In some implementations, the input received via the user interface of the device comprises a request to uninstall the application and the subset of the stored data was collected by tracking interactions with the application received via the user interface. In some embodiments, based at least in part on the request to uninstall the application, the system provides, at the user interface on the device, a selectable option to remove the subset of the stored data related to the application from the database and the input further comprises a user interface selection of the selectable option to remove the data associated with the application from the database.

In some embodiments, the system provides, at the user interface of the device, an indication that the interactions with the application received via the user interface of the device are being tracked for use in the training of the AI model. In some implementations, the system tracks the interactions with the application received via the user interface by accessing a tracking setting of the user device, wherein the tracking setting indicates one or more conditions under which collected data is permitted to be used for the AI model, determining a status of the device of the user, comparing the status of the device of the user to the tracking setting, and, based at least in part on the comparison of the status of the device of the user to the tracking setting, storing the data in the database. In some embodiments, the system stores the data in the database based at least in part on receiving an approval input via the user interface of the device, wherein the approval input comprises user consent to the data being stored, and wherein the system generates a plurality of user consent tokens for respective applications for which the user consent is received. In some implementations, the system stores the data in the database by transferring a portion of the received data to a buffer, determining whether a request not to use the portion of the received data in relation to the AI model is received within a threshold period of time from the transferring, and, based at least in part on determining that the request has not been received within the threshold period of time and at least a portion of a consent token of the plurality of user consent tokens indicates that the portion of the received data may be provided to the database, providing the portion of the received data from the buffer to the database to be included in the stored data. In some embodiments, the system monitors device activity to determine available resources for the device and the system stores the data in the database, calculates the plurality of model weights, modifies the stored data, or calculates the adjusted model weights based at least in part on determining that the available resources for the device exceed a threshold. In some implementations, the system stores the data in the database by anonymizing the stored data by adding random noise to the stored data.

BRIEF DESCRIPTION OF THE DRAWINGS

The present disclosure, in accordance with one or more various embodiments, is described in detail with reference to the following figures. The drawings are provided for purposes of illustration only and merely depict typical or example embodiments. These drawings are provided to facilitate an understanding of the concepts disclosed herein and should not be considered limiting of the breadth, scope, or applicability of these concepts. It should be noted that for clarity and ease of illustration, these drawings are not necessarily made to scale.

FIG. 11 is flowchart of a detailed illustrative process for protecting and managing usage of user data for AI model training, in accordance with some embodiments of this disclosure.

DETAILED DESCRIPTION

The disclosed methods and systems enhance user data collection, protection, and management for AI model training, which may include one or more components designed to collect user data, store user data, manage user data, and leverage user data to train an AI model, to help ensure consensual and lawful data collection, and usage for AI model training.

Figure 1:
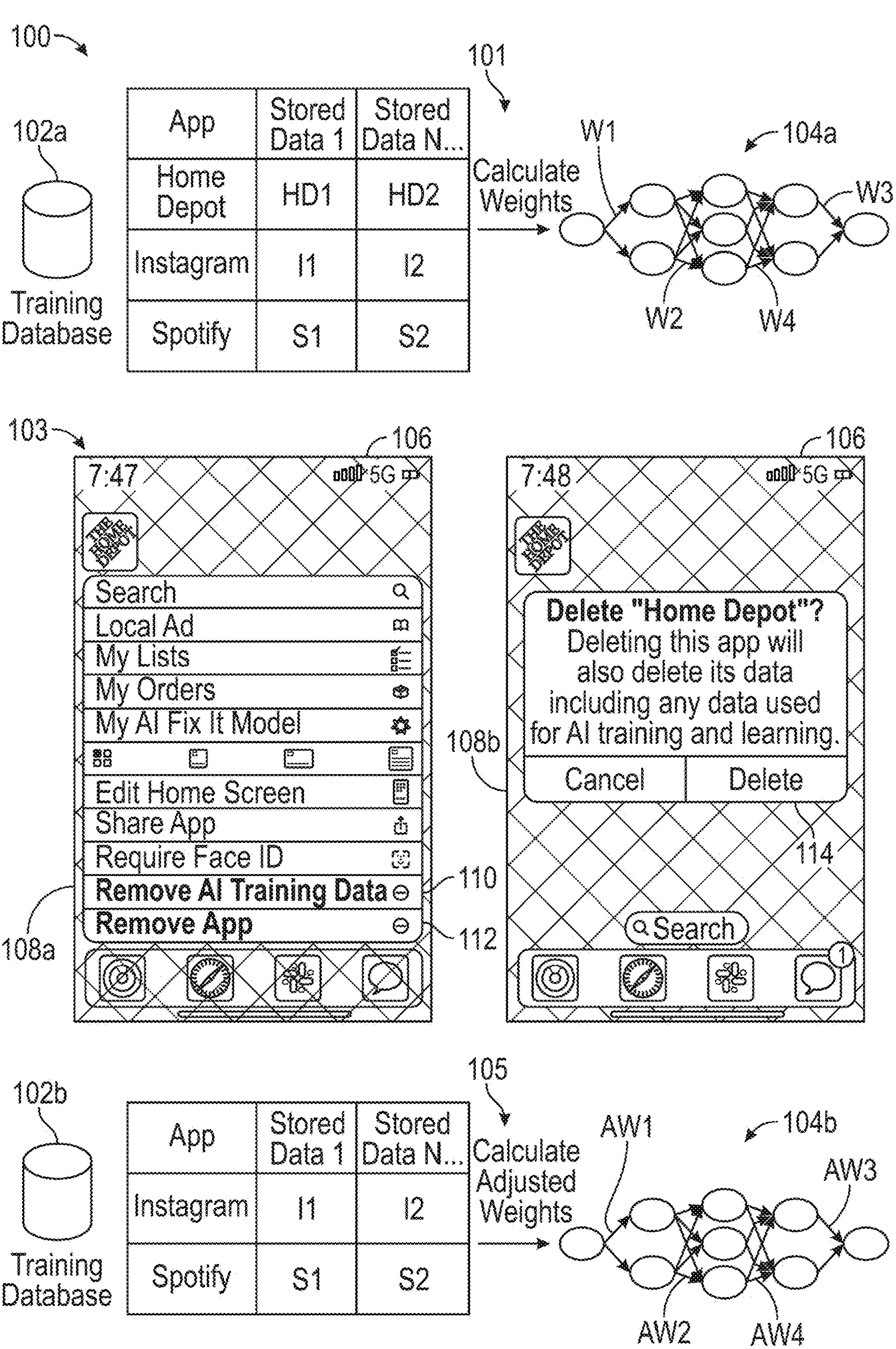
FIG. 1 depicts an illustrative system for protecting and managing usage of user data for AI model training, in accordance with some embodiments of this disclosure.

FIG. 1 depicts system 100 (e.g., an AI model training system) for protecting and managing usage of user data for AI model training, in accordance with some embodiments of this disclosure. In some embodiments, system 100 (also referred to herein as "the system") may comprise or correspond to and/or be implemented at/on a user device 106, one or more servers, any suitable AI model training system, or any other suitable device, service, or platform, or any combination thereof. The system may comprise or correspond to an AI model trained on user data (e.g. corresponding to or associated with interactions of one or more users with one or more applications stored or provided to user device 106 and/or other devices), which may be executed and trained at least in part on user device 106 and/or user equipment 1007, 1008, or 1010 of FIG. 10 and/or at one or more remote servers (e.g., server 1004 of FIG. 10) and/or at or distributed across any of one or more other suitable computing devices or network equipment, in communication over any suitable number and/or types of networks (e.g., the Internet, cellular networks, satellite networks, and/or any other suitable networks). The AI model training system (e.g., system 100) may be configured to perform the functionalities (or any suitable portion of the functionalities) described herein. In some embodiments, the AI model and/or the training system may be a stand-alone application or may be incorporated as part of any suitable application or system. The AI model and/or training system may comprise or employ any suitable number of displays, sensors or devices such as those described in FIGS. 1-11, or any other suitable software and/or hardware components, or any combination thereof.

In some embodiments, the AI model training system (e.g., system 100) may be installed at or otherwise provided to (and accessed by) a particular computing device, may be provided via an application programming interface (API), or may be provided as an add-on application to another platform or application. In some embodiments, software tools (e.g., one or more software development kits (SDKs)) may be provided to any suitable party, to enable the party to implement the functionalities described herein.

Figure 9:
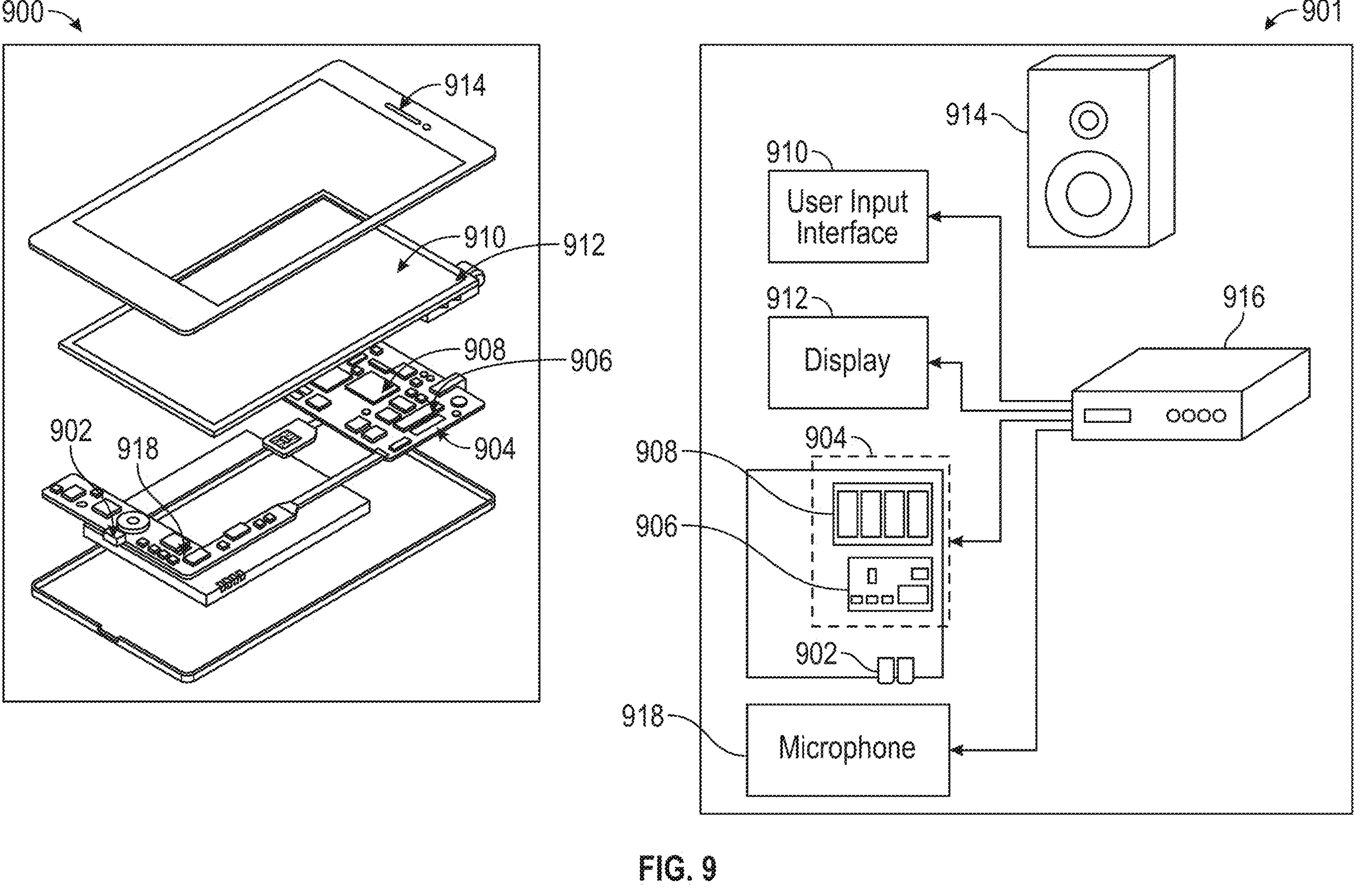
FIG. 9 shows illustrative devices and systems for protecting and managing usage of user data for AI model training, in accordance with some embodiments of this disclosure.
Figure 10:
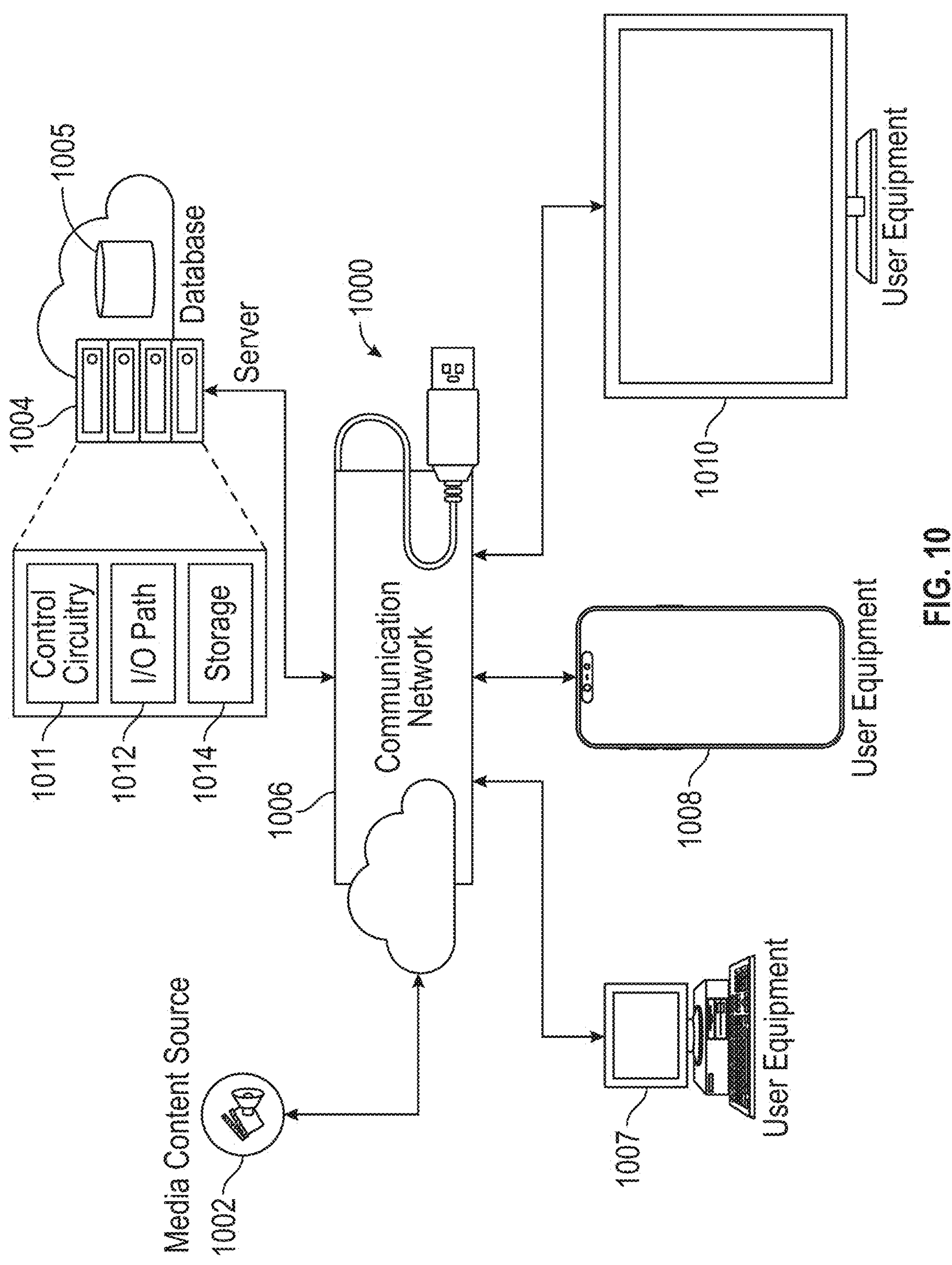
FIG. 10 shows illustrative devices and systems for protecting and managing usage of user data for AI model training, in accordance with some embodiments of this disclosure.

In some implementations, system 100 comprises user devices 106 of FIG. 1, or any number of devices (e.g., server 1004 of FIG. 10), comprising software and hardware components, such as, for example, control circuitry and memory, and may correspond to one or more of devices 1007, 1008, and/or 1010 of FIG. 10. In some embodiments, the control circuitry of user device 106 is control circuitry 904, as further described in FIG. 9 below. The hardware components and applications installed on (or otherwise accessed via) user device 106 may be managed by an OS, e.g., a mobile OS, such as, for example, iOS, Android, webOS, or any other suitable OS for any other suitable computing device that is capable of deriving or using user data (e.g., OS for computers, such as, for example, Windows OS, Linux OS, or Mac OS; OS for IOT devices; OS for smart or connected TVs; OS for extended reality (XR) devices; OS for wearables; OS for vehicles; OS for digital assistant devices or applications; OS for medical prostheses or medical devices; OS for Bluetooth devices). System 100 may implement the techniques depicted in FIG. 1 based on instructions stored in non-transitory memory (e.g., non-transitory memory 908 of FIG. 9, or storage 1014 of FIG. 10). System 100 enables user device 106 to download, install or otherwise access applications (e.g., Home Depot, Instagram, Spotify, one or more applications native to the OS, third-party applications, or any other suitable applications, or any suitable combination thereof) and allow a user of user device 106 to access and manage these applications, e.g., user interface 108*a* and/or user interface 108*b*) of user device 106.

In some embodiments, user device 106 downloads applications over communication network 1006 of FIG. 10. System 100 may receive or otherwise access data collected by applications installed on (or otherwise accessed via) user device 106, one or more of which may be provided by one or more servers. System 100 may access the data collected by applications installed on (or otherwise accessed via) user device 106 by using an API, a software interface that allows two or more applications to communicate with each other.

In some embodiments, user device 106 may be a mobile device such as, for example, a smartphone or tablet. In some embodiments, user device 106 may comprise or correspond to a laptop computer, a personal computer, a desktop computer, a smart TV, a smart watch or wearable device, smart glasses, a stereoscopic display, a wearable camera, XR glasses, XR goggles, a near-eye display device, or any other suitable user equipment or computing device, or any combination thereof.

The present disclosure provides for a comprehensive system (e.g., system 100) aimed at improving user consent management, data privacy, and AI training processes within OSs (e.g., mobile OSs or any other suitable OS). In some embodiments, the system enables third-party apps to add their data to train a base AI model or add fine-tuned weights to a base model within an OS by utilizing a dynamic consent mechanism that allows users to modify their data-sharing preferences in real time, with adjustments based on status parameters (e.g., context, location, time), and a digital assistant that interacts with users to manage preferences and consent settings dynamically.

In some embodiments, the disclosed system (e.g., system 100) enables applications on a user device (e.g., smartphone) to contribute real-time training data adhering to predefined AI categories, utilizing structured training templates based on the type of data they collect. In some implementations, the system (e.g., system 100) receives data from applications on the user device that can be processed either locally on the user device or in the cloud, allowing the AI model to be dynamically updated with new weights. In some embodiments, the system ensures that when an application is uninstalled, the associated training data and model weights are deleted, maintaining the integrity of the base model. In some implementations, a centralized settings panel within the settings menu of the user device enables seamless management of user consent. In some embodiments, the system provides real-time data collection notifications and detailed logs to enhance user transparency and control over their data. In some implementations, the system includes a scheduling component that leverages historical device usage patterns and real-time activity recognition to optimize the timing of AI training sessions, thereby reducing disruption to the user. In some embodiments, the system utilizes differential privacy techniques to anonymize user data before it is used for training, thereby ensuring that individual data points cannot be traced back to specific users. In some implementations, the system incorporates a hybrid training approach, combining local and cloud computing to balance computational loads and enhance performance.

In some embodiments, the differential privacy techniques may be applied differently to different training templates and/or data types. For instance, in some embodiments, the system adds, for categorical data, randomized noise with controlled distribution to preserve the integrity of category proportions, and adds, for numerical data, additive noise calibrated to ensure minimal distortion of statistical properties such as mean and variance. Similarly, in some implementations, the system adds, for image data, pixel-level obfuscation and/or structured noise to retain essential visual patterns while protecting sensitive features. In some embodiments, these variations in privacy application enable the system to tailor anonymization methods based on the specific characteristics and requirements of each data type or template. In some embodiments, the system uses data fusion techniques and federated learning to maintain user privacy while allowing for the aggregation and analysis of data from multiple applications. In some implementations, the system utilizes a dynamic consent mechanism to allow users to modify their data-sharing preferences in real time, such as by making adjustments to their collected data based on context or location. In some embodiments, the system includes a digital assistant that interacts with users to manage preferences and consent settings dynamically, ensuring that users' preferences are continuously updated and aligned with their current habits and needs.

As shown in FIG. 1, at 101, in some embodiments, system 100 comprises training database (or datastore) 102*a*, AI model 104*a* comprising a plurality of weights (e.g., W1, W2, W3, W4), user device 106, user interface 108*a* comprising a plurality of selectable options (e.g., selectable option 110, selectable option 112), user interface 108*b* comprising a plurality of selectable options (e.g., selectable option 114), training database 102*b*, and AI model 104*b* comprising a plurality of weights (e.g., AW1, AW2, AW3, AW4). In some implementations, the system stores training database (or datastore) 102*a* in non-transitory memory, training database 102*a* comprising any suitable amount of stored data (e.g., HD1, HD2, I1, I2, S1, S2) for any suitable number or types of applications (e.g., Home Depot, Instagram, Spotify). AI model 104*a* may be, for example, a neural network, a large language model (LLM), or any other suitable AI or machine learning model, or any suitable combination thereof. In some embodiments, AI model 104*a* may comprise an interconnected group of processing nodes, e.g., any suitable number of input nodes and output nodes, and any suitable number of hidden layers. While four weights are shown in FIG. 1 for ease of illustration, it should be understood that any suitable number of one or more weights may be computed for the AI model. In some embodiments, the weights may be used only for user device 106, or may be used in association with other devices of the user and/or devices of a family of the user or other authorized or permitted persons associated with the user.

In some embodiments, system 100 collects data by tracking user interactions (e.g., voice data, web activity, application activity, location data, communications with other users, and/or any other suitable data) with the user interface (e.g., user interface 108*a*, user interface 108*b*) of user device 106 or data otherwise received by user device 106 or associated with a user of user device 106. For example, in some implementations, system 100 tracks user interactions with the user interface of user device 106 when the user interface is displaying any of applications native to user device 106, applications that have been downloaded to user device 106, applications being accessed via user device 106, websites being accessed via user device 106, or any other suitable interactive display. In some embodiments, the data received or collected and associated with user interactions does not include all data associated with every user interaction, but instead includes data, e.g., potentially private or personal data related to likewise select interactions, such as, for example, with one or more select applications.

In some examples, system 100 includes a data collection module with various sensors on the user device (e.g., mobile device), including accelerometers, gyroscopes, cameras, microphones, touchscreens, and/or any other suitable components that are utilized to capture user interactions such as typing patterns, application usage, voice assistant usage, interactions with other people through social network APIs and SMS text APIs, and navigation habits. Further, in some embodiments, system 100 stores collected data according to a specific service (e.g., Google™), a specific topic (e.g., upcoming vacation, food preferences), a data type (e.g., categorical data, numerical data, text data), or any other suitable organization structure in training database 102*a*, or in addition to or instead of organizing the data in training database 102*a* according to the respective application that the data was collected and/or received from. AI model 104*a* may be trained using the collected data, which may, in some embodiments, be labeled and categorized with metadata, and by processing the collected data, AI model 104*a* may fine-tune its internal logic to refine its ability to provide personalized or relevant recommendations or suggestions to a user of user device 106. In some embodiments, the AI model may be trained via supervised learning or unsupervised learning and/or using reinforcement learning techniques.

In some implementations, system 100 stores the collected data with additional metadata or hidden data, such as, for example, the application the data was mined from, the location of user device 106 when the interaction was collected, the date and time of when the interaction was collected, or any other suitable metadata that further describes the collected data. In some implementations, system 100 generates for display an indication that interactions with the user interface are being tracked and/or determines whether or not interactions with the user interface may be tracked based on settings previously defined by the user and accessible to system 100, as further described in reference to FIG. 2.

In some embodiments, system 100 receives data to be stored in training database 102*a* from applications on user device 106. In some implementations, system 100 receives real-time training data adhering to predefined AI categories from a plurality of applications associated with user device 106 (e.g., downloaded to user device 106, installed on user device 106, accessed via user device 106, linked to an account logged in on user device 106). In some embodiments, system 100 receives a plurality of data types from a plurality of applications and/or digital services, each data type corresponding to a respective training template of a plurality of training templates, and a respective training template structured based on the corresponding data type.

In some embodiments, the system (e.g., system 100) receives data from applications installed on (or otherwise accessed via) user device 106 adhering to predefined AI categories such as question and answer, tabular data, time series data, categorical data, numerical data, text data, image data, relational data, or any other suitable data, or any suitable combination thereof. In some implementations, each application follows a structured training template based on the type of data it collects and shares. For instance, in some embodiments, a question-and-answer application uses a template that collects pairs of questions and their corresponding answers, ensuring that the data includes various contexts and formats to improve the AI's understanding and response accuracy. Further, in some implementations, a tabular data application follows a template designed to capture rows and columns of structured data, maintaining the relationships between different data points. In some embodiments, time series data applications collect sequential data points at regular intervals, capturing trends and patterns over time. In some implementations, categorical data applications gather data that fits into predefined categories, ensuring each category is well-represented. In some embodiments, numerical data applications collect precise numerical values, while text data applications focus on capturing free-form text from various sources. In some implementations, image data applications follow a template to gather labeled images, ensuring each image is tagged with relevant metadata. In some embodiments, relational data applications collect data that highlights relationships between different entities, using templates that capture these connections effectively. In some implementations, depending on the type of data, metadata or hidden information can be embedded, which can later be useful while deleting data points from the AI model. For example, if certain training data is associated with metadata "Home Depot," such training data may be quickly identified and removed from the database, e.g., based on input received from the user. As another example, metadata and/or templates may be used to define how data can be used. For example, metadata associated with certain portions of training data may be used to indicate that the Home Depot app may have access to, e.g., historical carpentry tools purchased by the user, but not historical trips to, e.g., Las Vegas.

In some embodiments, system 100 stores data from multiple applications that provide similar services or data in training database 102*a*. For example, in some embodiments, system 100 stores data from multiple financial apps installed on (or otherwise accessed via) user device 106. In some implementations, system 100 uses data fusion techniques and correlation analysis to generate generalized data to be stored in training database 102*a*. For example, in some implementations, system 100 collects and/or receives data from multiple financial apps and generates and stores aggregated data points based on the collected and/or received data. In some embodiments, system 100 utilizes federated learning techniques to maintain user privacy and prevent the sharing of raw data between applications. In some implementations, system 100 receives aggregated insights from an application when the application processes data locally. In some embodiments, system 100 combines the aggregated insights provided by applications to improve (e.g., fine-tune, train, retrain, modify) the AI model, thereby leveraging diverse data sources to improve accuracy while preserving user privacy.

In some embodiments, system 100 initially stores one or more portions of data, to later be stored in training database 102*a*, in a buffer. In some implementations, system 100 compares data newly collected and/or received to the data already stored in training database 102*a* to determine if the new data is redundant and should be discarded, if the new data corresponds to a previously stored data point(s) or model weight(s) and a parameter of those data point(s) or model weight(s) should be modified (e.g., a confidence score increased, an occurrence count increased, an intensity score increased, or any other suitable parameter change), if the new data helps clarify a previously stored data point and should be stored in relation to the previously stored data point, if the new data is unique and should be transmitted to training database 102*a*, or any other suitable determination to inform how to manage the new data. In some implementations, system 100 stores new data in the buffer and utilizes lazy loading techniques to transmit the new data, as discussed in further detail later in this disclosure. In some embodiments, system 100 stores new data in the buffer and transmits the new data to training database 102*a* based on an input received via the user interface (e.g., user interface 108*a*, user interface 108*b*) of user device 106 corresponding to user consent to storing the collected data, user modification of the data in the buffer (e.g., user deletes data from the buffer prior to the data in the buffer being transmitted to training database 102*a*), or explicit user review and approval of transmittal of the data from the buffer to training database 102*a*. In some embodiments, data is transferred from the buffer after a certain period of time (e.g., five minutes) or until another data point is received.

In some implementations, system 100 stores new data in the buffer and transmits the new data to training database 102*a* based on any of determining that a threshold amount of time has passed since the new data was collected/received, determining that resources available to user device 106 have passed a threshold amount, determining that the amount of new data stored in the buffer has reached a threshold amount, determining that the new data is approved for transmittal to training database 102*a* by comparing of aspects of the new data (e.g., time of collection, source, location of collection) to data consent settings previously defined by the user (e.g., times of days that user data may be collected for AI model training, applications that user data may be collected or received from for AI model training, data types that may be used for AI model training, data topics that may be used for AI model training, locations where user data may be collected for AI model training, or any other suitable data consent parameter), or any other suitable parameter for managing the buffer. In some embodiments, system 100 presents, at the user interface of user device 106, any of a selectable option to receive explicit user consent for transmitting the data stored in the buffer to training database 102*a*, a summary of data stored in the buffer, a selectable option to receive user denial of transmitting the data stored in the buffer to training database 102*a*, an option to select specific data from the buffer to be transmitted to training database 102*a*, an option to select specific data from the buffer to be discarded, or any other suitable indication of the data stored in the buffer, or any other suitable selectable option to enable the user to manage the use of the data in the buffer by system 100.

In some embodiments, system 100 provides a user interface, accessible via user device 106 such as, for example, within the OS settings menu of user device 106, comprising a listing or summary of the data stored within either of the buffer or training database 102*a*. In some implementations, system 100 enables the modification of the data stored within either of the buffer or training database 102*a* at the user interface comprising the listing or summary of the stored data. For example, in some embodiments, system 100 provides a navigable user interface at user device 106 that may be interacted with to view all data that is stored within training database 102*a*. In some implementations, system 100 organizes the presented data (e.g., the data stored within training database 102*a* via the navigable user interface) according to any of the source of the data (e.g., the application, platform, service, or other suitable source that the data was mined from), the topic of the data, the type of data, or any other suitable organization system to enable efficient browsing and review of the stored data. In some embodiments, system 100 enables data stored within either of the buffer or training database 102*a* to be manually deleted and/or new data to be manually added. For example, in some implementations, when the navigable user interface comprising the listing or summary of the data stored within training database 102*a* indicates that a user preference for soda is stored as "Pepsi" and the user of user device 106 sees this but knows that they prefer "Diet Coke," system 100 subsequently receives a user input and/or a series of user inputs via the navigable user interface to replace the user preference for "Pepsi" with a user preference for "Diet Coke" (e.g., a selection of an option to delete the "Pepsi" soda preference, a selection of an option to add a new soda preference, a plurality of selections of letters of a keyboard to spell the words "Diet Coke," and a selection of an option to input the typed soda preference). Further, in some embodiments, system 100 deletes the data corresponding to the user preference for "Pepsi" from training database 102*a* and adds data corresponding to a user preference for "Diet Coke" to training database 102*a*.

In an embodiment, system 100 applies differential privacy techniques to anonymize user data before it is transmitted/uploaded to training database 102*a* to be used for AI training. In some implementations, system 100 utilizes frameworks such as, for example, Apple's Differential Privacy and Google's TensorFlow Privacy library, or custom implementations thereof, or any other suitable framework, to ensure that individual data points cannot be traced back to specific actions. In some embodiments, system 100 adds controlled random noise to the data stored or to be stored in training database 102*a*, thereby making it difficult to identify any single data point while still allowing for useful analysis. For example, in some implementations, system 100 collects and/or receives data from an application installed on (or otherwise accessed via) the user device, the data corresponding to activities such as visiting a store, making purchases, or other actions. In some embodiments, before the data is used for AI training and/or before the data is uploaded/transmitted to training database 102*a*, system 100 adds random noise to each data point to ensure privacy. In some implementations, system 100 changes the amount and type of noise added to each data point based on the sensitivity of the data point and the desired level of privacy. For example, in some embodiments, when system 100 collects/receives data indicating that a user visited Home Depot to get supplies for fixing a fence, system 100 adjusts the recorded time spent at the store and/or the amount spent. In some implementations, system 100 adds the noise to the collected/received data to ensure that the true data points are obscured without significantly distorting the overall dataset. In some embodiments, system 100 stores noisy data in training database 102*a* and then uses the stored noisy data to train an AI model. In some implementations, system 100 adds an amount of random noise that is small enough to ensure that it does not significantly impact the learning process, thereby ensuring that the models can still learn accurate patterns and make predictions based on general trends in the data.

In some implementations, system 100 calculates weights (e.g., model weights) for AI model 104*a* based on the data stored in training database 102*a*. In some embodiments, the system processes the training data stored in training database 102*a* either in the cloud or on the user device (e.g., user device 106), depending on the design, requirements, or resource availability. For example, in some embodiments, when system 100 trains the AI model in the cloud, the training data is transmitted to a cloud server where it undergoes training processes to calculate (e.g., generate) weights. In some implementations, when system 100 trains the AI model device on the user device, the data is processed locally to calculate these weights. In some embodiments, system 100 dynamically integrates weights calculated from the training data into a base AI model on user device. In some embodiments, system 100 includes a hybrid training system that combines local and cloud computing for AI training. In some implementations, system 100 initially processes data on user device 106 to generate preliminary weights that are then sent to cloud servers using end-to-end encryption for further training and refinement. In some embodiments, when AI model 104*a* is an enhanced model that has been developed in the cloud, system 100 integrates AI model 104*a* into the system of user device 106 using frameworks such as Core ML on iOS and TensorFlow Lite on Android. In some implementations, system 100 utilizes adaptive bandwidth management to ensure efficient data transfer and adjusts activities based on network conditions and user activity to avoid any negative impact on the device's performance. In some embodiments, system 100 receives weights (e.g., model weights) from applications that have already processed relevant data to determine weights. In some implementations, system 100 provides a template to third-party applications for calculating weights for the AI model. In some embodiments, system 100 requests weights from third-party applications. In some embodiments, system 100 requests data from third-party applications based on determining that more data is to be used to calculate one or more weights for the AI model, that receiving the requested data would enable at least one more accurate weight to be calculated, or any other suitable reason. In some embodiments, system 100 stores the calculated weights in a weight database or datastore (e.g., in association with the stored AI model, which may, in some embodiments, be provided to user device 106 by way of an API). In some implementations, system 100 stores the calculated weights with metadata or hidden data corresponding to any of the data used to calculate the weights, the sources of the data used to calculate the weights, the date and/or time the weights were calculated, or any other suitable attribute of the calculated weights. In some embodiments, every calculated weight is stored in the weight database as checkpointed weights that are then later retrieved by system 100 based on determining to fine-tune or update AI model 104*a* or revert to a previous fine-tuning or updating of AI model 104*a*.

In some embodiments, system 100 provides the calculated (e.g., generated) weights (e.g., model weights) to AI model 104*a* such as model weight W1, W2, W3, and W4. In some implementations, system 100 provides weights to AI model 104*a* to replace weights that are currently being used by AI model 104*a*. In some embodiments, system 100 provides any number of weights to AI model 104*a*, which comprises any number of interchangeable heads or specific layers that can be updated with new weights. In some embodiments, system 100 provides a complete set of weights to AI model 104*a* such as the first time that AI model 104*a* is trained on the data stored in training database 102*a*. In some implementations, system 100 fine-tunes AI model 104*a* and utilizes a dynamic loading mechanism to fetch and apply new weights on the fly. In some embodiments, system 100 uses model quantization techniques to reduce the size of weight files to ensure that the weights can be loaded quickly and efficiently. In some embodiments, system 100 utilizes several kinds of quantization techniques, such as post-training quantization, which involves quantizing the model after it has been trained. In some embodiments, system 100 converts the weights from a high-precision format, such as 32-bit floating point, to a lower precision format, such as 8-bit integer which is a straightforward approach that would not require retraining the model, making it a quick way to reduce model size. In some embodiments, system 100 uses quantization-aware training (e.g., training the model with quantization in mind). In some implementations, during training, system 100 simulates the effects of quantization during both the forward and backward training passes, allowing the model to learn and adapt to the lower precision, often resulting in better performance compared to post-training quantization. In some embodiments, system 100 utilizes dynamic quantization, also known as weight quantization, by applying quantization only during inference. In some implementations, system 100 converts weights to lower precision formats dynamically as they are needed, balancing model size reduction and maintaining accuracy.

In some embodiments, system 100 enhances the overall performance and responsiveness of the AI model while conserving device resources by utilizing quantization techniques. In some implementations, system 100 includes a version control system for managing the model weights, tracking changes, and ensuring compatibility between different versions of weights and AI model 104*a*. In some embodiments, system 100 stores model weights in an app sandboxed file storage system, potentially using a cloud service that can be quickly accessed by user device 106. In some implementations, system 100 uses efficient serialization formats, such as TensorFlow Lite or ONNX, to minimize loading times and ensure efficient storage. In some embodiments, system 100 utilizes lazy loading, where weights are loaded into memory only when needed, rather than preloading all weights, as part of the dynamic loading mechanism. For example, in some embodiments, when AI model 104*a* already has access to W1, W2, and W3, system 100 provides only W4 to AI model 104*a*. In some implementations, system 100 provides weights to AI model 104*a* only when AI model 104*a* requests a weight from system 100, such as when AI model 104*a* is attempting to perform an action that requires a specific weight to perform the action effectively.

In some embodiments, when a specific part of the model needs to access new weights, system 100 checks if these weights are already loaded in memory. In some implementations, when system 100 determines that a needed weight is not already loaded in memory, system 100 loads the required weight from storage, downloads it from the cloud, retrieves it from the weight database, or any other suitable action or combination thereof. In some embodiments, system 100 utilizes memory-mapped files, which allow system 100 to map parts of the weight files of AI model 104*a* to virtual memory. In some embodiments, when AI model 104*a* accesses these parts, system 100 instructs the OS to load the relevant data into physical memory. For example, in some implementations, when AI model 104*a* is initialized, system

100 loads only the core components to be utilized for immediate operation into memory, and specific weights for various tasks are not initially loaded.

In some implementations, when a specific task is requested, such as image recognition, or when it can be determined that a specific app would be used (for example using the Home Depot app when you are inside the Home Depot store), AI model 104*a* identifies which weights are required for this task, system 100 checks if these weights are already loaded in memory, and, if these weights are not already loaded in memory, system 100 loads the required weights from storage into memory at that time. For example, in some embodiments, system 100 loads weights (e.g., W1, W2, W3, W4) identified by AI model 104*a* to be utilized for performing an image recognition task, AI model 104*a* uses the loaded weights to perform the image recognition task, and after the task is completed, these weights either remain in memory if system 100 determines that there is sufficient available memory, or, if system 100 determines that there is not sufficient available memory, the weights are unloaded to free up space for other tasks. In some embodiments, when memory usage becomes high, system 100 unloads weights that are not currently in use, based on predefined criteria such as the least recently used algorithm, ensuring that only the most relevant weights are kept in memory.

As shown in FIG. 1, at 103, in some embodiments, system 100 generates for display user interface 108*a* on user device 106. In some embodiments, system 100 generates a plurality of selectable options, such as selectable option 110 corresponding to "Remove AI Training Data" and selectable option 112 corresponding to "Remove App," on user interface 108*a*, each selectable option corresponding to an action to be taken in regard to an application (e.g., the Home Depot app). In some implementations, upon receiving an input corresponding to a selection of selectable option 110, system 100 removes all data corresponding to the Home Depot app from training database 102*a*. In some embodiments, system 100 removes data corresponding to the Home Depot app from training database 102*a* by identifying data stored in training database 102*a* that is associated with the Home Depot app, such as data stored with metadata identifying the Home Depot app as the source of the data in any suitable manner.

In some embodiments, upon receiving an input corresponding to a selection of selectable option 112 (e.g., "Remove App"), system 100 generates for display user interface 108*b* on user device 106. In some embodiments, system 100 displays a question (e.g., "Delete 'Home Depot'?") and provides a plurality of selectable options for answering the question, such as selectable option 114 corresponding to user confirmation to delete the Home Depot app, on user interface 108*b*. In some implementations, system 100 causes a summary of the requested action to be displayed on user interface 108*b* (e.g., "Deleting this app will also delete its data including any data used for AI training and learning."). In some embodiments, system 100 provides a selectable option on user interface 108*b* corresponding to deleting the app while still retaining any data sourced from the app for AI training and learning. In some implementations, upon receiving an input corresponding to a selection of selectable option 114, system 100 removes all data corresponding to the Home Depot app from training database 102*a*.

As shown in FIG. 1, at 105, in some implementations, upon receiving an input corresponding to a selection of selectable option 110 from user interface 108*a* or an input corresponding to a selection of selectable option 114 from user interface 108*b*, system 100 removes all data corresponding to the Home Depot app from training database 102*a*, thereby generating training database 102*b*. In some embodiments, system 100 generates training database 102*b* by modifying the data stored in training database 102*a*. For example, in some embodiments, when system 100 receives an input corresponding to deleting a specific data point or set of data points stored within training database 102*a* from a centralized setting panel that is integrated into the settings menu of user device 106, as previously described, system 100 removes the specific data point or set of data points from training database 102*a* and generates training database 102*b*. Further, in some implementations, when system 100 receives an input to remove data associated with a specific topic from training database 102*a*, such as by receiving the voice instruction "Forget everything you know about my love for vacuum cleaners" via a virtual assistant, system 100 analyzes the data stored within training database 102*a* to identify data points associated with vacuum cleaners and the corresponding love for vacuum cleaners, removes the identified data points from training database 102*a*, and thereby generates training database 102*b*.

In some implementations, in response to or in conjunction with generating training database 102*b*, system 100 identifies weights that were calculated using the data that was removed from training database 102*a* to generate training database 102*b*. For example, in some embodiments, when W1, W2, W3, and/or W4 were calculated using data sourced from the Home Depot app, subsequent to receiving an input corresponding to a selection of selectable option 110 from user interface 108*a* and/or an input corresponding to a selection of selectable option 114 from user interface 108*b*, system 100 determines that W1, W2, W3, and/or W4 are no longer permitted to be used and/or are tainted, e.g., were calculated based at least in part on data that has been requested to be removed from the AI model, and thus that such weights are to be removed or modified for subsequent usage by the AI model. In some embodiments, system 100 identifies the weights calculated using the data that was removed from training database 102*a* by analyzing the metadata stored with the weights, by analyzing the weight database to identify weights with sources corresponding to the deleted data, or by any other suitable method. For example, in some implementations, system 100 analyzes a metadata log that tracks the contribution of specific data points to each weight, uses version control records to trace the lineage of the weights back to the original data, and/or applies reverse influence mapping to determine which portions of the model's architecture were most affected by the deleted data. In some embodiments, in response to identifying W1, W2, W3, and W4 as no longer permitted to be used, system 100 halts activities associated with the identified weights, unloads the identified weights, initiates approximate unlearning (e.g., based on determining that available resources and/or computational power required for exact unlearning is not readily available), resumes the activities associated with the identified weights based on the approximate unlearning, monitors available resources to identify a time when exact unlearning may be initiated, and/or, when available resources are determined to be at a level that can support exact unlearning, initiates exact unlearning. In some embodiments, approximate unlearning may be more resource-light than exact unlearning.

In some embodiments, system 100 utilizes approximate unlearning to reduce the influence of the data corresponding to the uninstalled app (e.g., Home Depot) in real time (e.g., immediately after receiving an input corresponding to a selection of selectable option 110 from user interface 108*a* or an input corresponding to a selection of selectable option 114 from user interface 108*b*) without retraining (or without fully retraining) the model by recalibrating model weights, either through heuristic adjustments or by using metadata that tracks the contributions from the app. In some embodiments, system 100 uses approximate unlearning as a temporary step meant to quickly minimize the impact of the data that has been requested to be removed. In some embodiments, system 100 determines, based on available resources, user device 106 activity, or other parameters that exact unlearning (e.g., fully retraining the model by calculating new model weights based on training database 102*b*) may be performed in real time and thus does not perform approximate unlearning. In some implementations, system 100 provides selectable options to the user corresponding to initiating exact unlearning, initiating approximate unlearning, halting activities associated with the weights identified as being based on the data requested to be removed until exact unlearning can be performed, continuing to utilize the identified weights until exact unlearning can be performed, or any other suitable option for fully and effectively managing AI model 104*a* when data from training database 102*a* has been requested to be removed.

In some implementations, system 100 utilizes exact unlearning to fully retrain AI model 104*a* to remove all traces of the deleted data, which helps ensure complete data removal, and helps enable the updating of AI model 104*a* to AI model 104*b*, e.g., as though the deleted data and removed or adjusted weights had never been used. In some embodiments, system 100 initiates exact unlearning when a resource threshold for exact unlearning is determined to be met, based on monitoring device conditions (e.g., battery and CPU usage) to determine available resources. In some embodiments, system 100 triggers exact unlearning when system 100 determines that performing exact unlearning won't disrupt performance. For example, in some embodiments, when a fitness app is uninstalled, system 100 performs approximate unlearning to immediately reduce the reliance of AI model 104*a* on fitness data, and later, when resources are determined to reach the resource threshold, performs exact unlearning to ensure all fitness-related influences are completely removed. In some embodiments, system 100, when performing exact unlearning, analyzes the data stored in training database 102*a* to identify all data that needs to be removed to generate training database 102*b*, identifies all weights that need to be replaced with adjusted weights based on training database 102*b* (e.g., such as by analyzing the weights stored in the weight database), generates training database 102*b*, calculates adjusted weights to replace the identified weights, and provides the adjusted weights to the AI model to generate AI model 104*b*.

In some embodiments, the digital assistant can prompt users for changes to their consent based on detected patterns or specific triggers, such as the installation of a new application or a change in user behavior. For instance, if the digital assistant detects frequent usage of a health tracking application in a gym, it might suggest enabling data sharing for the application to allow AI training specific to fitness and health contexts. The system also enables efficient management of pre trained or pre-fine-tuned models and weights handling unlearning/untraining of a base model as well as the removal of training data or model weights when an application is uninstalled or removed by the user. In some embodiments, the system performs buffering of captured data intended for training that is held until a period of time elapses without the digital assistant "hearing" a phrase such as "forget that" or pre-emptively saying phrases such as "Hey Siri, don't learn about my upcoming trip to Las Vegas."

In some embodiments, upon generating training database 102*b*, system 100 calculates adjusted weights, such as, for example, adjusted one or more weights AW1, AW2, AW3, and AW4, to be used by AI model 104*b*, an updated version of AI model 104*a*. In some embodiments, upon providing the adjusted weights to AI model 104*a*, AI model 104*b* is generated, which may be used to receive subsequent inputs of data and provide suitable output in association with user device 106, based on the adjusted weights. In some implementations, when only W1 is identified as being calculated based on the data requested to be deleted (e.g., data sourced from the Home Depot app), AI model 104*b* comprises AW1, W2, W3, and W4, as only W1 is adjusted (e.g., removed or fine-tuned or recomputed). In some embodiments, system 100 calculates and provides adjusted weights to AI model 104*b* in the same manner as previously disclosed in regard to calculating and providing weights to AI model 104*a*. In some embodiments, the AI model may be fine-tuned or retrained to explicitly exclude training data (e.g., associated with the Home Depot app) removed from the database, and/or the AI model may be fine-tuned or retrained using a data set that omits the removed training data. For example, in some embodiments, system 100 analyzes AI model 104*b* to identify which parts of AI model 104*b* were influenced by the data (e.g., associated with the Home Depot app) and adjusts those areas to remove the data's impact. In some implementations, this adjustment is different from retraining with a dataset that omits the removed data. In some embodiments, the fine-tuning or retraining may include starting form a base model, and retraining or fine-tuning such based model with new data, and if data is to be unlearned, training may start again with the base model. In some embodiments, if portions of data from various sources is to be forgotten or removed, unlearning techniques may be employed and/or storing intermediate states of the model may be performed.

In some implementations, system 100 includes an update mechanism that checks for new weights periodically or when certain conditions are met, such as, for example, Internet connectivity or user activity. In some embodiments, the update mechanism downloads, verifies, and/or applies new weights seamlessly to AI model 104*a* or 104*b*. In some embodiments, to add the new weights (e.g., adjusted weights) to the base model, a dynamic loading mechanism temporarily unloads the relevant portions of the model from memory to prevent interference with ongoing operations. Further, in some embodiments, the new weights are loaded into the appropriate sections of the model using a memory-mapped file approach, which allows for efficient loading and unloading of model components. In some implementations, system 100 integrates these weights into the model structure and, once the integration is complete, the updated model components are reloaded into memory, thereby minimizing disruption to the operation of the AI model (e.g., AI model 104*a* or 104*b*). In some embodiments, system 100 receives a subsequent input to modify the training data of the AI model (e.g., receives new data from an application, tracks new user activity to be stored in training database 102*b*, receives a subsequent input to delete specific data, receives an input to delete a second app), in which case AI model 104*b* becomes AI model 104*a* (e.g., the AI model that is currently performing tasks based on provided weights and now needs to be updated) and training database 102*b* becomes training database 102*a* (e.g., the training database that the currently utilized and running AI model was trained on and now needs to be updated).

In some embodiments, system 100 reverts a fine-tuning (e.g., update) that was made to AI model 104*a* (e.g., reverts AI model 104*b* back to AI model 104*a*) by retrieving the previous weights from a weight database where the previous weights were stored and checkpointed. For example, in some implementations, when updating AI model 104*a* with AW1, AW2, AW3, and AW4, system 100 stores W1, W2, W3, and W4 in a weight database and checkpoints (e.g., timestamps) the weights with the date and time they were utilized from (e.g., or any other suitable parameter to describe the weights). Further, in some embodiments, upon receiving an input to revert AI model 104*b* to AI model 104*a* (e.g., receiving a request to return AI model 104*b* to its state during a specific date that corresponds to when W1, W2, W3, and W4 were used), system 100 retrieves W1, W2, W3, and W4 from the weight database and replaces AW1, AW2, AW3, and AW4 with W1, W2, W3, and W4, or a subset of said weights.

In some embodiments, in addition to or alternatively to weights of AI model 104*a*, any suitable parameter (e.g., weights, bias values, and/or other internal logic of the AI model) or hyperparameter (e.g., a number of layers and/or nodes or neurons, number of neurons per layer, or other network topology) of AI model 104*a* may be updated by system 100, e.g., based at least in part on an input to uninstall or cease providing an application installed or accessible by user device 106. Such parameters (e.g., weights or biases) may be associated with nodes of the AI model, and/or connections between nodes, learned during training (e.g., using backpropagation techniques, and/or any other suitable techniques). In some embodiments, adjusting weights of other parameters of the AI model may comprise enabling or inhibiting certain nodes of the AI model.

Figure 2:
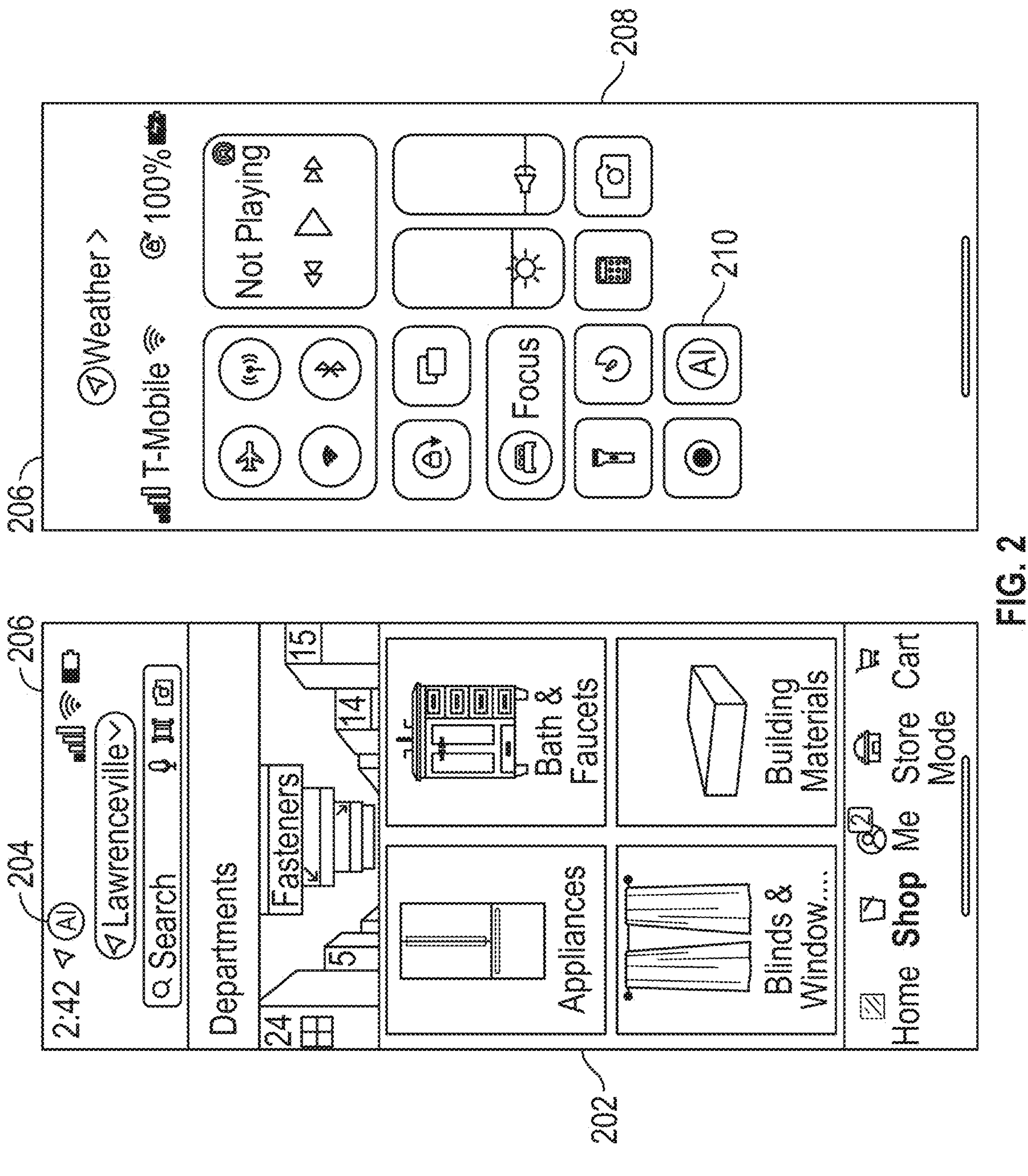
FIG. 2 depicts an illustrative system for providing an indication and control option of data collection for training an AI model at a user device, in accordance with some embodiments of this disclosure.

FIG. 2 depicts system 200 for providing an indication and control option of data collection for training an AI model at a user device, in accordance with some embodiments of this disclosure. As shown in FIG. 2, in some embodiments, system 200 generates for display user interface 202, comprising indicator 204, at user device 206. In some embodiments, system 200 is system 100 of FIG. 1, and user device 206 is user device 106 of FIG. 1. In some implementations, when system 200 is tracking interactions with user interface 202 to collect data to be stored in a training database (e.g., training database 102*a*, training database 102*b*), system 200 generates indicator 204 to indicate that interactions with user interface 202 are being tracked in order to collect data to train an AI model (e.g., AI model 104*a*, AI model 104*b*). In some implementations, system 200 generates a more detailed indicator 204 that indicates, for example, what application is currently collecting data and from what endpoint. For example, in some embodiments, when Spotify is collecting data while user device 206 is providing local MP3s in a VLC (VideoLAN Client) media player, system 200 displays indicator 204 within the VLC media player, and indicator 204 includes an indication that Spotify is the application collecting the data. In some implementations, system 200 provides additional details regarding the data collection (e.g., what application is tracking interactions, what data has so far been mined, or any other suitable information) within a contextual widget based on receiving an input corresponding to a selection of indicator 204.

In some embodiments, indicator 204 acts as a button, which when pressed or otherwise interacted with displays or opens an application page detailing the AI learning data collection from a given application or from a plurality of applications. In some implementations, system 200 provides data (date, time, location, content display, text, image) at the application page detailing the AI learning data collection and enables user adjustments to update, delete or alter the data. In some embodiments, system 200 displays, via a user interface of user device 206, a list, table or other data presentation method of insights that are inferred (e.g., have been learned) by the AI model (e.g., AI model 104*a* of FIG. 1) based on collected training data (e.g., data stored in training database 102*a*). For example, in some embodiments, if system 200 "sees" and learns that a user prefers Coca Cola to Pepsi, or likes to go to Chick-Fil-A, the user may see items such as "About you/Food/Drinks" and a corresponding data entry of "It seems that you like to drink Coke" and "About you/Food/Fast Food" and a corresponding data entry of "It seems that you like to eat at Chick-Fil-A." In some implementations, system 200 enables the user to remove data entries (e.g., delete the data entry of "It seems that you like to drink Coke") or update it implicitly (e.g., input that Pepsi is preferred to Coca Cola).

In some embodiments, when system 200 receives an indication from the application being interacted with (e.g., the Home Depot app) that the application is tracking interactions with user interface 202 to collect data to train an AI model, system 200 causes indicator 204 to be displayed on user interface 202. In some implementations, system 200 generates indicator 204 to show via user interface 202 that that interactions with user interface 202 are being tracked. In some embodiments, indicator 204 indicates that the interactions with user interface 202 are being tracked to train an AI model (e.g., when indicator 204 is a small circle with "AI" inside). In some implementations, indicator 204 is any indication that interactions with user interface 202 are being tracked, regardless if the mined data will ultimately be used to train an AI model or not, such as a target symbol, an image of a magnifying glass, an image of a pickaxe (e.g., because data is being mined), or any other suitable indication. For example, in some embodiments, system 200 mines data by tracking interactions with user interface 202, analyzes the mined data, and ultimately discards the data (e.g., does not upload the data to a training database) based on the analysis.

In some embodiments, system 200 generates for display user interface 208, comprising selectable button 210, at user device 206. In some implementations, system 200 configures selectable button 210 to act as a switch for allowing interactions with the user interfaces (e.g., user interface 202) to be tracked to mine data. For example, in some embodiments, when selectable button 210 is toggled on, system 200 tracks interactions with the user interface of user device 206. In some embodiments, when system 200 is tracking interactions user device 206, upon receiving an input corresponding to a selection of selectable button 210, system 200 stops tracking interactions with user device 206. In some embodiments, system 200 causes indicator 204 to be displayed on user interface 202 based on receiving a selection of selectable button 210 at user interface 208 that toggles tracking on. In some implementations, system 200 causes indicator 204 to no longer be displayed on user interface 202 based on receiving a selection of selectable button 210 at user interface 208 that toggles tracking off. In some embodiments, selectable button 210 is any button corresponding to data tracking, such as data tracking for AI model training, and is represented by any suitable icon, such as "AI," a target, or a pickaxe.

In some embodiments, system 200 configures selectable button 210 to act as a trigger to launch a centralized data collection and AI training settings panel integrated into the OS settings menu of user device 206. For example, in some implementations, upon receiving an extended selection of selectable button 210 (e.g., user holds selectable button 210 for two seconds rather than simply tapping it once), system 200 launches the centralized data collection and AI training settings panel. In some embodiments, system 200 includes, within the centralized data collection and AI training settings panel, a listing or summary of the training data that has been mined at user device 206, a listing or summary of the training data that is stored in a training database (e.g., training database 102*a* of FIG. 1), a listing or summary of data that is being stored in a buffer, options to modify data collection consent (e.g., based on applications, topics, data types, location, time of day, or any other suitable parameter of data collection), options to modify stored data (e.g., delete data that is stored, replace stored data with a specified replacement, add a specified data point), or any other suitable mechanism for enabling user control and understanding of data collection and AI model training. In some embodiments, the settings and parameters outlined within the centralized data collection and AI training settings panel correspond to user consent tokens.

Figure 3:
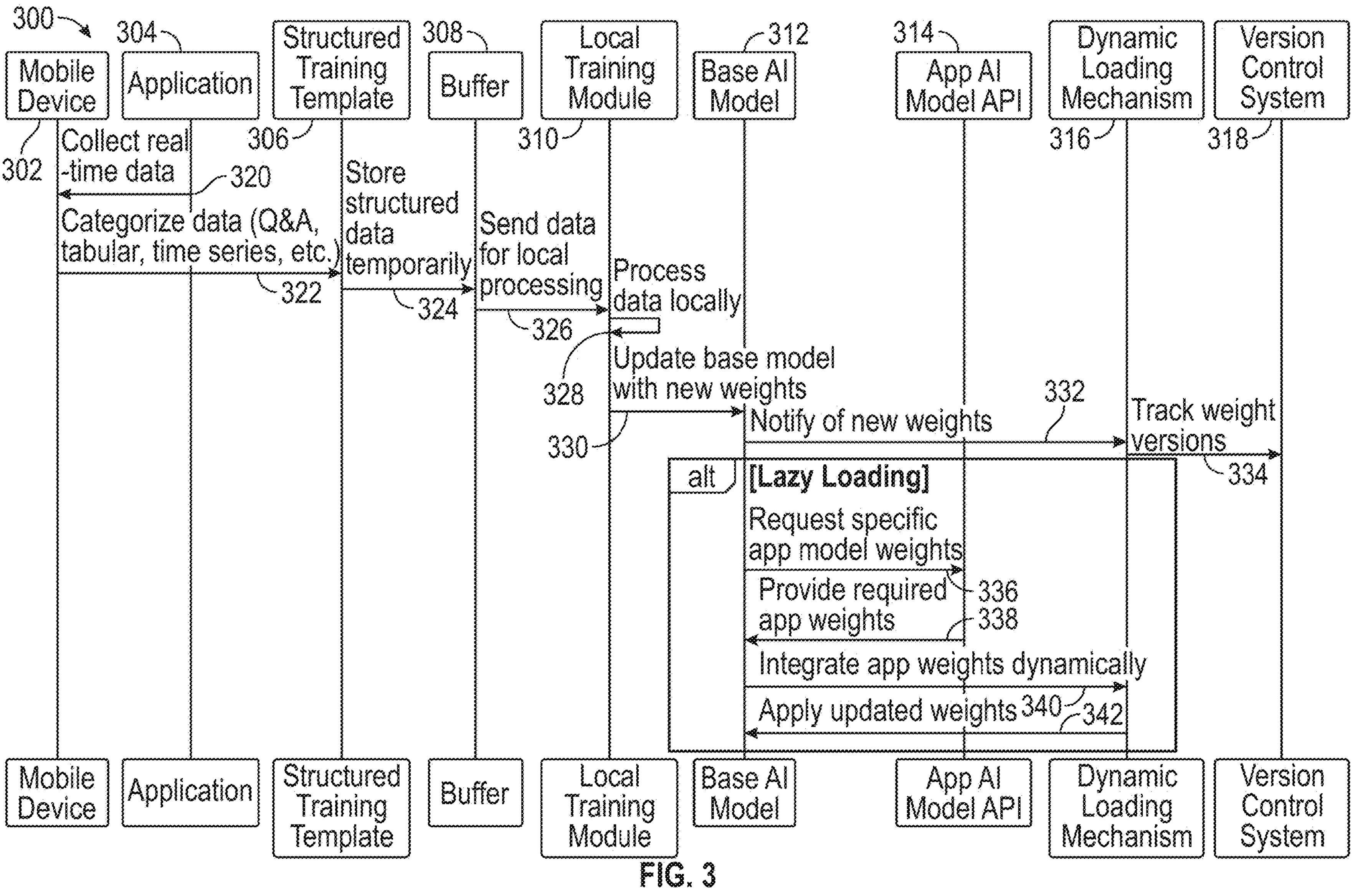
FIG. 3 is a sequence diagram of updating the weights of a base AI model by utilizing lazy loading, in accordance with some embodiments of this disclosure.

FIG. 3 is a sequence diagram that depicts process 300 comprising mobile device 302, application 304, structured training template 306, buffer 308, local training module 310, base AI model 312, app AI model API 314, dynamic loading mechanism 316, and version control system 318, in accordance with some embodiments of this disclosure. Process 300 may be implemented at least in part by, for example, system 100 of FIG. 1. In some implementations, mobile device 302 is user device 106 of FIG. 1 or user device 206 of FIG. 2. In some implementations, base AI model 312 is AI model 104*a* or 104*b* of FIG. 1. In some embodiments, at 320, application 304 (e.g., the Home Depot app) collects real-time data via mobile device 302 (e.g., based on interactions with the user interface of mobile device 302) and provides this data to the system (e.g., system 100 of FIG. 1). In some implementations, at 322, the system categorizes the data at mobile device 302 based on, for example, the data types of the collected data (e.g., Q&A, tabular, time series), and provides this data to structured training template 306. In some implementations, at 324, the system stores the structured data from structured training template 306 in buffer 308. In some embodiments, at 326, the system sends the data from buffer 308 to local training module 310 for local processing. In some implementations, at 328, the system processes the data locally via local training module 310. In some embodiments, at 330, the system updates base AI model 312 with new weights generated by local training module 310. In some implementations, at 332, the system notifies dynamic loading mechanism 316 of the new weights that base AI model 312 was updated with. In some embodiments, at 334, the system tracks weight versions provided to base AI model 312 via version control system 318. In some embodiments, based on parameters such as available storage or power accessible by mobile device 302, process 300 enters an optional lazy loading process. For example, in some implementations, at 336, base AI model 312 requests specific app model weights from app AI model API 314. In some implementations, at 338, app AI model API 314 provides the required app weights (e.g., the requested specific app model weights) to base AI model 312. At 340, base AI model 312 integrates the provided app weights dynamically via dynamic loading mechanism 316. In some embodiments, at 342, the system applies the updated weights to base AI model 312 such as, for example, via dynamic loading mechanism 316.

Figure 4:
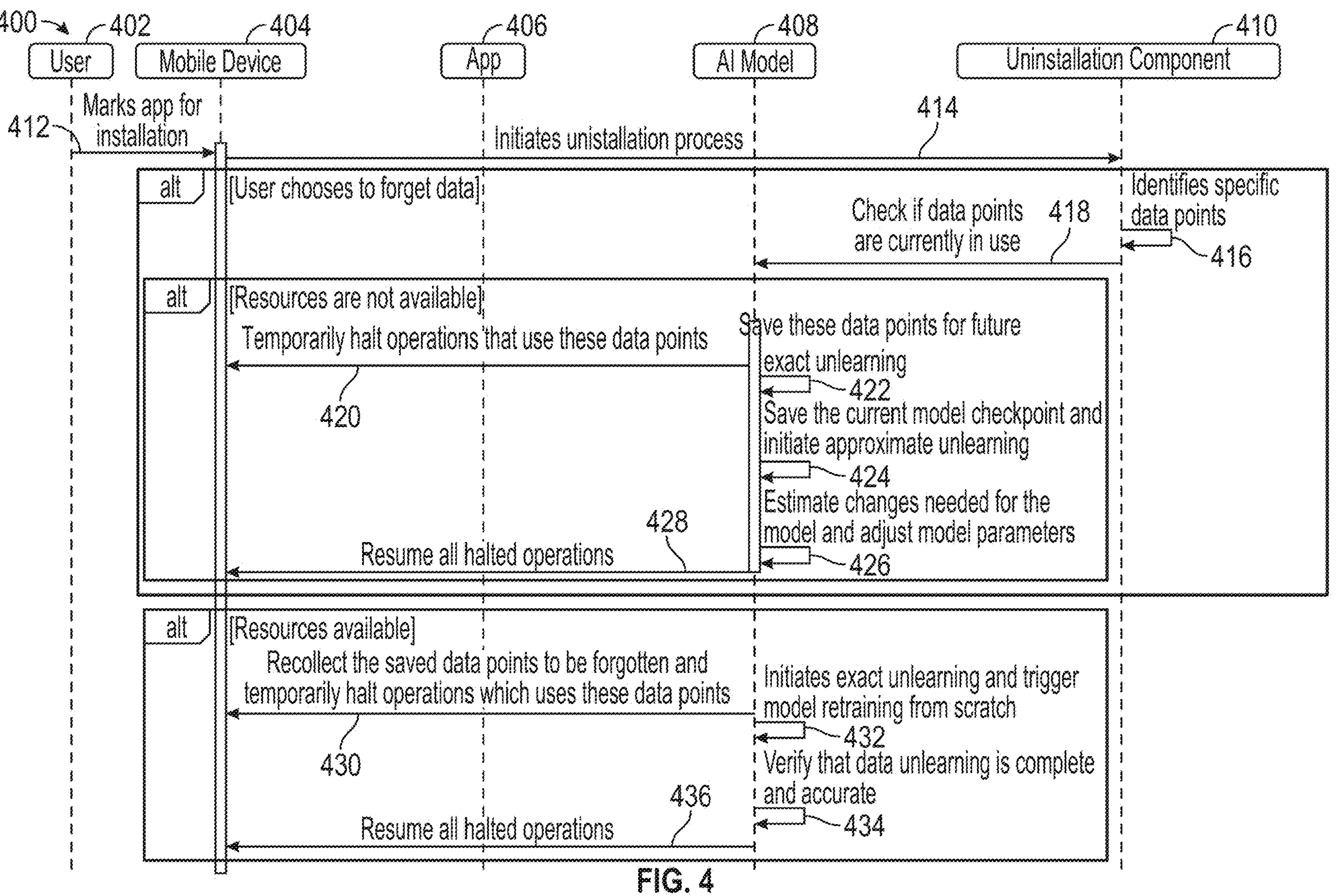
FIG. 4 is a sequence diagram of a dual unlearning approach for updating the weights of an AI model when an app has been uninstalled from a user device, in accordance with some embodiments of this disclosure.

FIG. 4 is a sequence diagram of a dual unlearning approach for updating the weights of an AI model when an app has been uninstalled from a user device, in accordance with some embodiments of this disclosure. In some embodiments, an advanced AI system designed for user devices (e.g., mobile devices) prioritizes learning exclusively from new data inputs. In some implementations, for the initial training, the system initially trains the AI model using a diverse dataset to establish a baseline of known data. In some embodiments, the AI model continuously adapts based on unique, real-time user interactions and environmental inputs, providing a personalized and dynamic user experience. In some embodiments, the system includes a storage system (local or cloud-based) that includes a buffering mechanism for temporarily storing encountered data that is intended for use in AI training.

In some implementations, the AI framework performs real-time comparisons of incoming data against the database of known data. In some embodiments, when a match is found, the incoming data is deemed redundant and is discarded. In some implementations, when no match is found, the data is marked as unique and forwarded to the AI model for learning. In some embodiments, when the data is new, the AI model either processes the new data or it is identified for lazy loading and is added to the database of known data, thereby ensuring privacy and accuracy by avoiding the reuse of pre-existing data sets. In some implementations, by filtering out redundant data, the system reduces unnecessary processing, saving CPU cycles, memory, and battery life, ultimately allowing the AI model to learn more quickly and efficiently by focusing on new information. In some embodiments, the incremental learning system may also maintain the filtered data over a predefined window for analysis, ensuring the model reflects only the most recent unlearned data. For example, in some embodiments, when the system is training an AI model to generate pictures, pictures taken by the cameras of the user device can be sent to the model for training. Further, in some implementations, the system will send several pictures of a cat from various angles to the AI model until the system determines that the model does not need more pictures of that particular cat.

In some embodiments, the system ensures that when an application is uninstalled from the user device (e.g., mobile device), the training data and model weights associated with that application are deleted. In some implementations, this process includes unloading the weights from the base model if they are currently in use, ensuring the base model is updated accordingly and no longer includes the data from the uninstalled application. In some embodiments, when an application is marked for uninstallation, the user may be presented with the option of "forgetting" the AI model training data that was provided by the application. In some implementations, when the user decides to remove the training data, the system first identifies the specific model weights that were contributed by the application. In some embodiments, when these weights are currently loaded in memory as part of the base model, the system initiates a controlled process to unload these weights. In some implementations, this process involves temporarily halting operations that depend on these weights to prevent any disruption or errors. In some embodiments, the system then proceeds to unload the relevant portions of the model from memory. In some implementations, this removal could be triggered automatically when an application is uninstalled by the user, or through manual selection.

In some embodiments, using a memory-mapped file approach, the system efficiently unloads the weights. In some implementations, this involves unmapping the memory regions associated with the application's weights, thereby freeing up the physical memory that was being used. In some embodiments, once the weights are unloaded from memory, the system deletes the weights from the storage, ensuring that all traces of the application's contribution to the model are removed. In some implementations, to maintain the integrity and performance of the AI model, the system updates the base model to exclude the contributions of the uninstalled application.

In some embodiments, the system performs a double unlearning process (e.g., real-time approximate unlearning during uninstallation and a delayed exact unlearning during optimized time) to achieve efficient system performance and better privacy management. In some implementations, uninstalling an application ensures that the AI model removes the entire application data and unloads the weights attached to it. In some embodiments, when the user choses to forget AI training data, the system identifies the forgetting data set, and an "approximate unlearning" process is initiated real time, efficiently minimizing the influence of data to be unlearned instead of completely removing it. In some implementations, this involves reweighting or adjusting model parameters to recalibrate the model and performing suitable adjustments to maintain model accuracy and efficiency. In some embodiments, the version control system previously discussed (e.g., in regard to FIG. 3) tracks these changes.

In some embodiments, the above-mentioned approximate unlearning process has efficient computational resource usage, but it doesn't ensure that the uninstalled data is completely erased from the model. In some implementations, before performing approximate unlearning, the system keeps track of the data to be forgotten, and when the resources become extensively available during a later time (e.g., during phone charging), upon user's approval, the system triggers a retraining signal that initiates an "exact unlearning" process. In some embodiments, this ensures that the AI model is retrained from scratch and behaves as if it has never seen the now-deleted data before. In some implementations, if the user chooses to delete data from the device, the base model also needs to undergo the similar double unlearning process explained above to forget the data.

FIG. 4 depicts process 400 comprising user 402, mobile device 404, app 406, AI model 408, and uninstallation component 410. Process 400 may be implemented at least in part by, for example, system 100 of FIG. 1. In some implementations, mobile device 404 is user device 106 of FIG. 1 or user device 206 of FIG. 2. In some embodiments, AI model 408 is AI model 104*a* or 104*b* of FIG. 1. In some implementations, at 412, user 402 marks app 406 for uninstallation at mobile device 404. In some embodiments, at 414, mobile device 404 initiates the uninstallation process by activating uninstallation component 410. In some implementations, when the system receives an input corresponding to user 402 opting to forget data associated with the app marked for uninstallation (e.g., app 406), process 400 continues to 416, where uninstallation component 410 identifies specific data points associated with the app marked for uninstallation (e.g., the Home Depot app, app 406). In some embodiments, at 418, uninstallation component 410 checks if the identified data points are currently in use by AI model 408.

In some embodiments, when parameters are determined to be below a threshold level (e.g., when available resources, storage, or power accessible by mobile device 404 is not available at a necessary degree), process 400 proceeds to 420, where the system halts operations performed by AI model 408 at mobile device 404 that use the identified data points. In some implementations, AI model 408 saves the identified data points for future exact unlearning at 422, saves the current model checkpoint and initiates approximate unlearning at 424, and estimates changes needed for AI model 408 and adjusts AI model 408 parameters accordingly at 426. In some embodiments, at 428, the system resumes operations performed by AI model 408 at mobile device 404 that were previously halted at 420. In some implementations, when the system determines that parameters are at or above a threshold level (e.g., when available resources, storage, or power accessible by mobile device 404 are adequate to support exact unlearning), process 400 proceeds to 430, where AI model 408 recollects the saved data points to be forgotten and temporarily halts operations it is performing at mobile device 404 that use the recollected data points. In some embodiments, at 432, AI model 408 initiates exact unlearning and triggers model retraining from scratch. In some implementations, at 434, the system verifies at AI model 408 that data unlearning is complete and accurate and, at 436, the system resumes operations performed by AI model 408 at mobile device 404 that were previously halted at 430.

Figure 5:
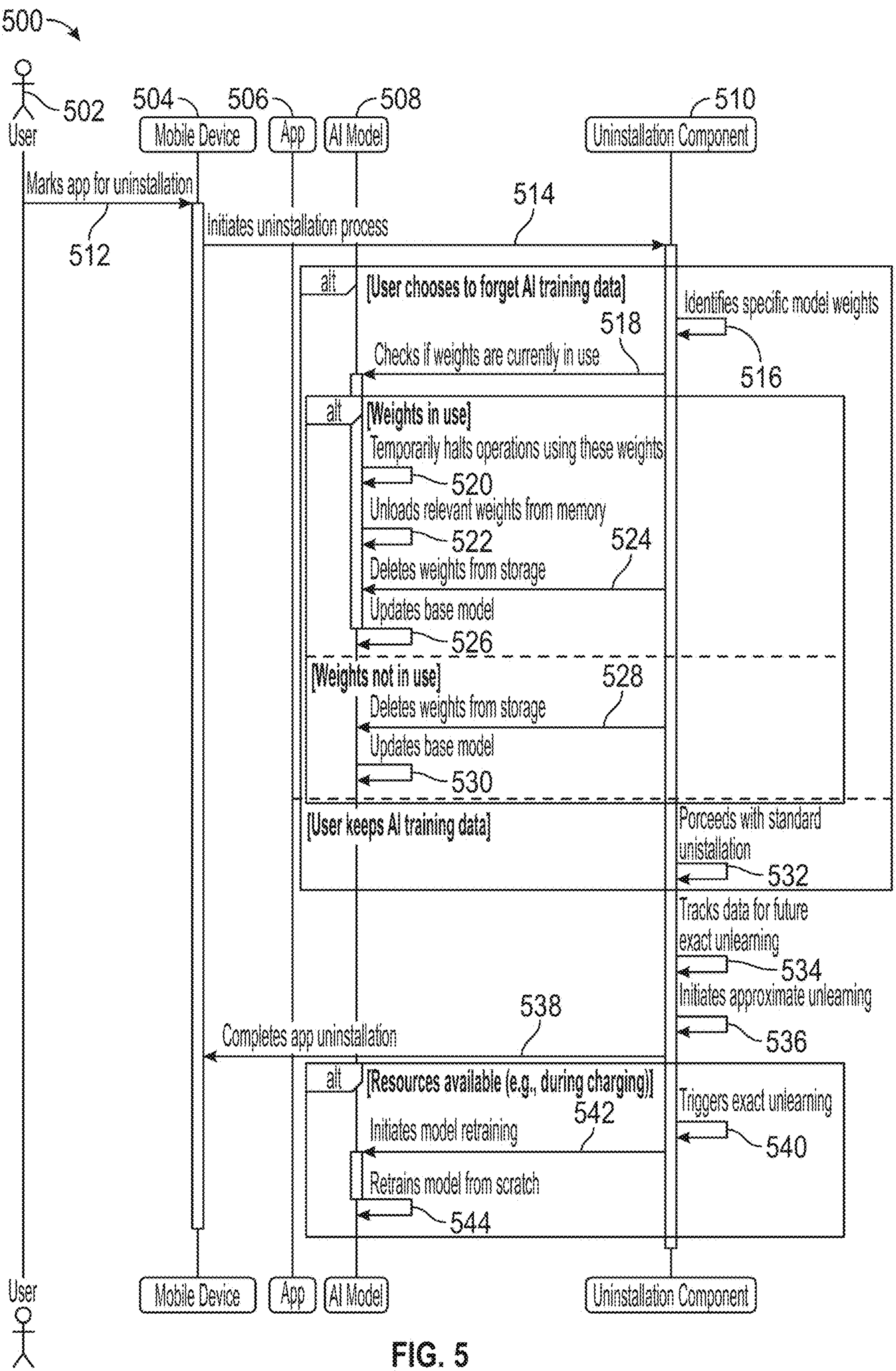
FIG. 5 is a sequence diagram of a dual unlearning approach for updating the weights of an AI model when an app has been uninstalled from a user device, in accordance with some embodiments of this disclosure.

FIG. 5 depicts process 500 comprising user 502, mobile device 504, app 506, AI model 508, and uninstallation component 510. Process 500 may be implemented at least in part by, for example, system 100 of FIG. 1. In some implementations, mobile device 504 is user device 106 of FIG. 1 or user device 206 of FIG. 2. In some embodiments, AI model 508 is AI model 104*a* or 104*b* of FIG. 1. In some implementations, uninstallation component 510 is uninstallation component 410 of FIG. 4. In some implementations, at 512, user 502 marks app 506 for uninstallation at mobile device 504. In some embodiments, at 514, mobile device 504 initiates the uninstallation process by activating uninstallation component 510. In some implementations, when the system receives an input corresponding to user 502 opting to forget AI training data associated with the app marked for uninstallation (e.g., app 506), process 500 continues to 516, where uninstallation component 510 identifies specific model weights associated with the app marked for uninstallation (e.g., the Home Depot app, app 506). In some embodiments, at 518, uninstallation component 510 checks if the identified weights are currently in use by AI model 508.

In some embodiments, when the identified weights are in use, process 500 proceeds to 520, where the system temporarily halts operations performed by AI model 508 at mobile device 504 that use the identified weights. In some implementations, the system, at 522, unloads relevant weights from memory for AI model 508 and, at 524, uninstallation component 510 deletes the weights from storage. In some embodiments, at 526, the system updates AI model 508. In some embodiments, when the identified weights are not in use, process 500 proceeds to 528, where uninstallation component 510 deletes the weights from storage and, at 530, the system updates AI model 508. In some implementations, when the system receives an input corresponding to user 502 opting to keep the AI training data associated with the app marked for uninstallation (e.g., app 506), process 500 continues to 532, where uninstallation component 510 proceeds with standard uninstallation. In some embodiments, at 534, uninstallation component 510 tracks data for future exact unlearning and, at 536, uninstallation component 510 initiates approximate unlearning. In some embodiments, at 538, uninstallation component 510 completes the uninstallation of app 506 at mobile device 504. In some implementations, when the system determines that parameters are at or above a threshold level (e.g., when available resources, storage, or power accessible by mobile device 504 are adequate to support exact unlearning such as during charging), process 500 proceeds to 540, where uninstallation component triggers exact unlearning. In some embodiments, at 542, uninstallation component 510 initiates the retraining of AI model 508 and, at 544, the system retrains AI model 508 from scratch.

In some embodiments, a centralized settings panel is integrated into the user OS settings menu (e.g., mobile OS settings menu) for obtaining explicit user consent for apps to participate in data collection for AI model training (e.g., as discussed in relation to FIG. 2). In some embodiments, a user interface component indicates data collection for AI training in real time (e.g., as discussed in relation to FIG. 2). In some implementations, this component utilizes platform-specific UI frameworks like UIKit on iOS and the Android UI framework to display a notification or icon, similar to the location services indicator, informing users when an application is collecting training data. Additionally, in some embodiments, a detailed log accessible to users provides transparency into what data is being collected, how it is being used, and by which applications.

Figure 6:
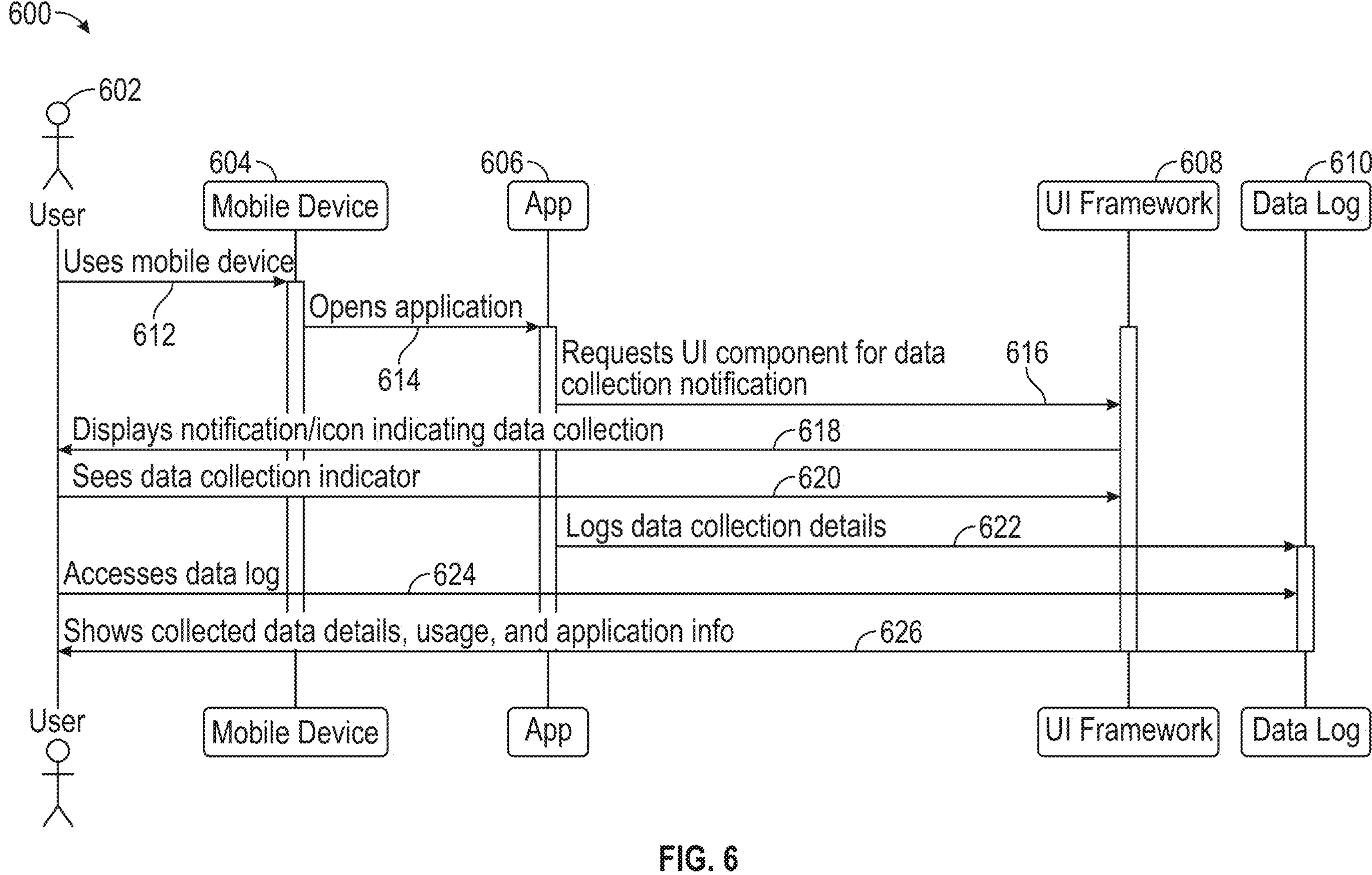
FIG. 6 is a sequence diagram of data collection transparency by an application at a user device, in accordance with some embodiments of this disclosure.

FIG. 6 depicts process 600 comprising user 602, mobile device 604, app 606, UI framework 608, and data log 610. Process 600 may be implemented at least in part by, for example, system 100 of FIG. 1. In some implementations, mobile device 604 is user device 106 of FIG. 1 or user device 206 of FIG. 2. In some embodiments, app 606 is app 304 of FIG. 3, app 406 of FIG. 6, or app 506 of FIG. 5. At 612, user 602 uses mobile device 604 by at 614, having mobile device 604 open app 606 (e.g., mobile device 604 displays a user interface that enables user 602 to interact with and use the services of app 606). At 616, app 606 requests, to UI framework 608, for a UI component of a data collection notification to be displayed at mobile device 604. At 618, UI framework 608 displays a notification, to user 602 via mobile device 604, indicating that data collection is being performed. At 620, user 602 sees the data collection indicator as caused to be displayed by UI framework 608. At 622, app 606 logs data collection details within data log 610 and, at 624, user 602 accesses data log 610 (e.g., via a centralized settings panel integrated into the OS settings menu of mobile device 604). At 626, the system shows the collected data details, usage, and application information logged in data log 610 to user 602 via mobile device 604.

In some embodiments, interactions with the system (e.g., either from a user or from an application residing on the user device) are semantically analyzed in order to determine a likely data source for a query response. For example, in some implementations, when a user allows a "Coca Cola" app to collect data and provide the data to the system for training, and the system receives the question "How many calories are in this Coke?" from a digital assistant of a user device (e.g., user device 106 of FIG. 1), the system annotates the query with metadata indicating that the "Coca Cola" app is likely a provider of data that may have been used to infer the response by the system. Similarly, in some embodiments, when a shopping app is allowed to query the system and the system receives the query "What type of drinks does the user prefer?" from the shopping app, the system indicates to the shopping app that the "Coca Cola" app may be a potential data source for an inference response to that query. In some implementations, the system displays this data as described in previous embodiments for review, update, or deletion by the user.

In some embodiments, during data collection from an application or from the phone's sensors, the system buffers the collected data on the device before sending it to the training module. In some implementations, this buffering period allows the system to temporarily hold the data, providing an opportunity for the user to review or modify the data collection. In some embodiments, during this buffering period, the system actively listens for user commands that indicate a preference for excluding certain data from AI training. For example, in some implementations, when the user interacts with the Home Depot App and the phone's sensors (such as the microphone, camera, or GPS) collect data, the system will temporarily store this data in a buffer. In some embodiments, while the data is buffered, the system monitors for specific voice commands or keywords that signal the intent of the user to exclude the data from being used in training, such as the voice commands "Hey Siri, forget that" or "Hey Siri, don't remember my trip to Home Depot." In some implementations, upon detecting such commands, the system immediately discards the buffered data, ensuring it is not sent to the training module and thus not incorporated into the AI model. In some embodiments, this mechanism allows users to have granular control over the data that is used for AI training, enhancing user privacy and consent management. In some embodiments, a voice recognition module operates continuously during the data buffering period, leveraging on-device natural language processing to identify commands. For example, in some implementations, when a relevant command is detected, the system verifies the context of the command to ensure that only the specified data is excluded from training. For instance, in some embodiments, when the command pertains to a specific app or activity, the system correlates the command with the buffered data from that source and discards it accordingly.

Figure 7:
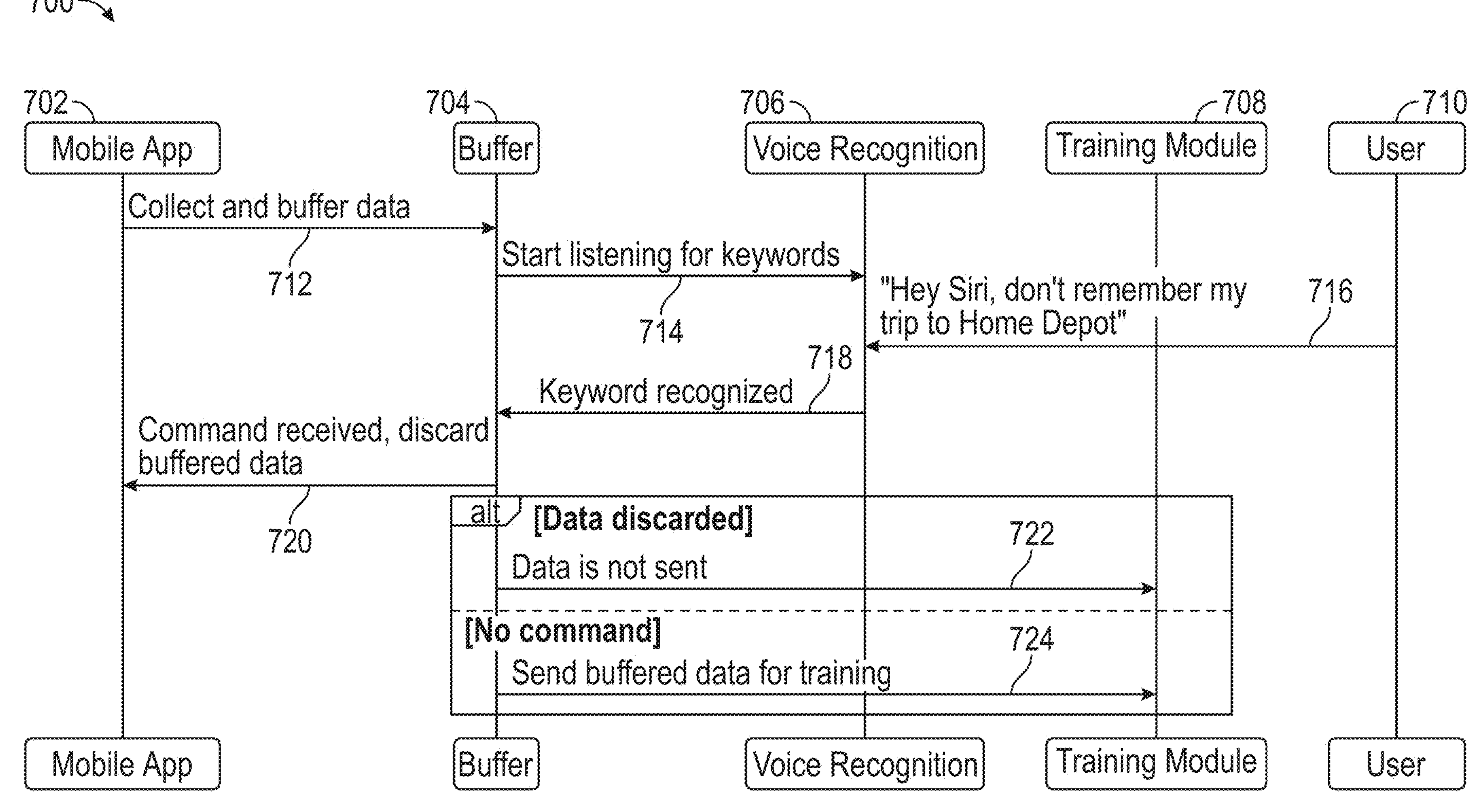
FIG. 7 is a sequence diagram of modifying data stored within buffer prior to transmitting the data for AI model training, in accordance with some embodiments of this disclosure.

FIG. 7 depicts process 700 comprising mobile app 702, buffer 704, voice recognition 706, training module 708, and user 710. Process 700 may be implemented at least in part by, for example, system 100 of FIG. 1. In some embodiments, mobile app 702 is app 606 of FIG. 6, app 304 of FIG. 3, app 406 of FIG. 6, or app 506 of FIG. 5. In some implementations, at 712, mobile app 702 collects and buffers data at buffer 704. In some embodiments, at 714, voice recognition 706 starts listening for keywords based on the collected data being sent to buffer 704. In some implementations, at 716, voice recognition 706 receives the voice command "Hey Siri, don't remember my trip to Home Depot" from user 710. In some embodiments, at 718, voice recognition 706 recognizes that the received voice command pertains to buffer 704, such as by recognizing a keyword. In some implementations, at 720, the system discards the buffered data based on the received command. In some embodiments, when the data has been discarded, process 700 proceeds to 722, where data is not sent from the buffer to training module 708. In some implementations, when the data has not been discarded (e.g., no command was received), process 700 proceeds to 724, where the buffered data is sent from the buffer to training module 708 for training the AI model (e.g., AI model 104*a* of FIG. 1).

In some embodiments, the system receives a pre-emptive request for the user device (e.g., user device 106 of FIG. 1) to "forget" collected data using a voice command or geofencing, or when others are around (e.g., such as when a nearby device is detected and determined to be part of a device management account in which the user participates). For example, in some implementations, when the system receives the voice command "Hey Siri, don't remember anything about my upcoming trip to Las Vegas, except where I parked my car," the system will refrain from collecting any data while the location or other data captured or received by the user device corresponds to (or is otherwise related to a trip to) Las Vegas. In some embodiments, certain types of data associated with the trip to Las Vegas may be stored, e.g., where the system identifies where the car of the user was parked at the airport. In some implementations, the system is restricted in collecting data based on whether the system determines the location of the user device to be in the home or office of the user. In some embodiments, an application deployment profile, such as the profiles installed on (or otherwise accessed via) mobile devices within a corporate environment, includes geo-fencing, network, or Bluetooth beacon meta data that mark specific areas as areas where no training is allowed. For example, in some implementations, a company restricts AI data collection within their corporate office or when the phone is connected to a particular Wi-Fi network.

In some embodiments, a scheduling component leverages historical device usage patterns and real-time activity recognition to determine the best times for AI training sessions. For example, in some implementations, the scheduling component uses frameworks such as Apple's Core Motion and the Android Activity Recognition API, or custom implementations thereof, or any other suitable framework, to monitor user activity and phone usage. In some embodiments, by analyzing this data, the system identifies periods of low activity or when the phone is charging to schedule AI training sessions, thereby minimizing disruption to the user. In some implementations, user-configurable priority settings allow customization of these intelligent training schedules based on individual preferences.

Figure 8:
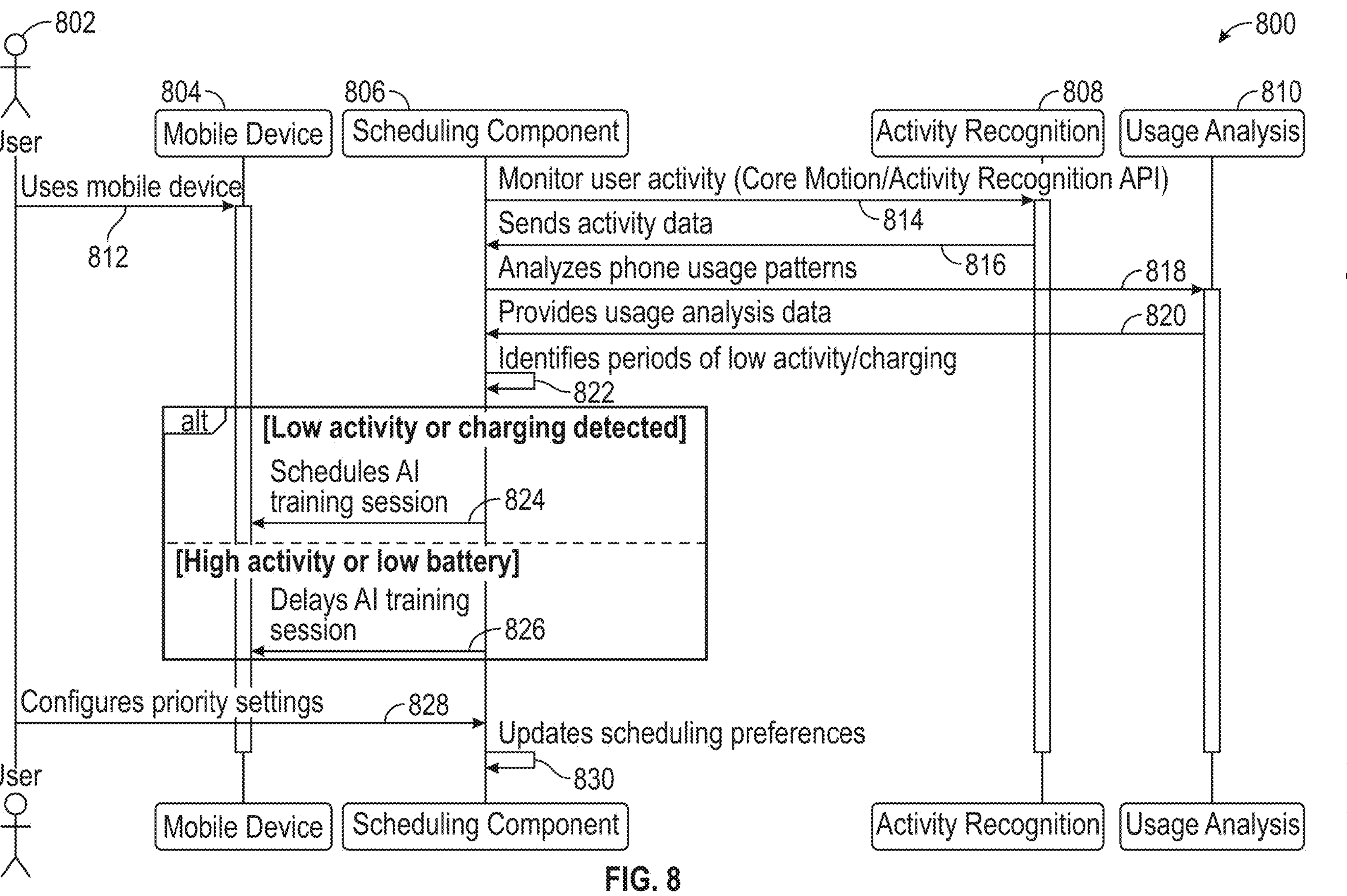
FIG. 8 is a sequence diagram of leveraging device usage patterns and real-time activity recognition to optimize AI model training, in accordance with some embodiments of this disclosure.

FIG. 8 depicts process 800 comprising user 802, mobile device 804, scheduling component 806, activity recognition 808, and usage analysis 810. Process 800 may be implemented at least in part by, for example, system 100 of FIG. 1. In some embodiments, mobile device 804 is user device 106 of FIG. 1 or user device 206 of FIG. 2. In some implementations, at 812, user 802 uses mobile device 804 and, at 814, scheduling component 806 monitors user activity with mobile device 804 via activity recognition 808 (e.g., Core Motion, Activity Recognition API). At 816, activity recognition 808 sends activity data to scheduling component 806. At 818, scheduling component 806 analyzes phone usage patterns via usage analysis 810 and, at 820, usage analysis 810 provides usage analysis data to scheduling component 806. At 822, scheduling component 806 identifies periods of low activity and periods of charging based on the received activity data and usage analysis data. In some embodiments, when scheduling component 806 detects low activity or charging, process 800 proceeds to 824, where scheduling component schedules an AI training session at mobile device 804. In some implementations, when scheduling component 806 detects high activity or low battery charge, process 800 proceeds to 826, where scheduling component 806 delays AI training sessions from happening at mobile device 804. At 828, user 802 configures priority settings for scheduling component 806 via mobile device 804. At 830, scheduling component 806 updates scheduling preferences based on the priority settings received from user 802.

FIG. 9 shows generalized embodiments of illustrative user equipment devices 900 and 901. For example, user equipment device 900 may be a smartphone device (e.g., user device 106 of FIG. 1). In another example, user equipment device 901 may be a user TV equipment system. User TV equipment system 901 may include set-top box 916. Set-top box 916 may be communicatively connected to microphone 918, speaker 914, and display 912. In some embodiments, microphone 918 may receive voice commands for a media or communication application. In some embodiments, display 912 may be a TV display or a computer display. In some embodiments, set-top box 916 may be communicatively connected to user input interface 910. In some embodiments, user input interface 910 may be a remote control device or a touchscreen. Set-top box 916 may include one or more circuit boards. In some embodiments, the circuit boards may include processing circuitry, control circuitry, and storage (e.g., RAM, ROM, hard disk, removable disk, etc.). In some embodiments, the circuit boards may include an input/output path. More specific implementations of user equipment devices are discussed below in connection with FIG. 10. Each one of user equipment device 900 and user equipment device 901 may receive content and data via input/output (I/O) path 902. In some embodiments, I/O path 902 is I/O circuitry. I/O path 902 may provide content (e.g., messages, calls, broadcast programming, on-demand programming, Internet content, content available over a local area network (LAN) or wide area network (WAN), and/or other content) and data to control circuitry 904, which includes processing circuitry 906 and storage 908. Storage 908 comprises the instructions for providing a personalized selection of modified content items to a user device as described in FIGS. 1-8, when executed by processing circuitry 906. Control circuitry 904 may be used to send and receive commands, requests, and other suitable data using I/O path 902, which may comprise I/O circuitry. I/O path 902 may connect control circuitry 904 (and specifically processing circuitry 906) to one or more communications paths (described below). I/O functions may be provided by one or more of these communications paths, but are shown as a single path in FIG. 9 to avoid overcomplicating the drawing.

Control circuitry 904 may be based on any suitable processing circuitry such as processing circuitry 906. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 904 executes instructions stored in memory (e.g., storage 908) for protecting and managing usage of user data for AI model training as described in FIGS. 1-8. Specifically, control circuitry 904 may perform the functions discussed above and below. In some implementations, any action performed by control circuitry 904 may be based on instructions received from the AI model training system (e.g., system 100 of FIG. 1, system 200 of FIG. 2).

In client/server-based embodiments, control circuitry 904 may include communications circuitry suitable for communicating with a communications application server or other networks or servers. The instructions for carrying out the above-mentioned functionality may be stored on a server (which is described in more detail in connection with FIG. 10). Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communication networks or paths (which is described in more detail in connection with FIG. 10). In addition, communications circuitry may include circuitry that enables peer-to-peer communication of user equipment devices, communication between a user and a contact of the user, or communication of user equipment devices in locations remote from each other (described in more detail below).

Memory may be an electronic storage device provided as storage 908 that is part of control circuitry 904. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 908 may be used to store various types of content described herein as well as the training database (e.g., training database 102*a* or 102*b* of FIG. 1) or the weight database as described above. Nonvolatile memory may also be used (e.g., to launch a boot-up routine and other instructions). Cloud-based storage, described in relation to FIG. 10, may be used to supplement storage 908 or instead of storage 908.

Control circuitry 904 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 904 may also include scaler circuitry for upconverting and downconverting content into the preferred output format of user equipment 900. Circuitry 904 may also include digital-to-analog converter circuitry and analog-to-digital converter circuitry for converting between digital and analog signals. The tuning and encoding circuitry may be used by user equipment device 900, 901 to receive and to display, to play, or to record content. The tuning and encoding circuitry may also be used to receive guidance data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 908 is provided as a separate device from user equipment device 900, the tuning and encoding circuitry (including multiple tuners) may be associated with storage 908.

A user may send instructions to control circuitry 904 using user input interface 910. User input interface 910 may be any suitable user interface, such as a remote control, mouse, trackball, keypad, keyboard, touch screen, touchpad, stylus input, joystick, voice recognition interface, or other user input interfaces. Display 912 may be provided as a stand-alone device or integrated with other elements of each one of user equipment device 900 and user equipment device 901. For example, display 912 may be a touchscreen or touch-sensitive display. In such circumstances, user input interface 910 may be integrated with or combined with display 912. Display 912 may be one or more of a monitor, a TV, a display for a mobile device, or any other type of display. A video card or graphics card may generate the output to display 912. The video card may be any processing circuitry described above in relation to control circuitry 904. The video card may be integrated with the control circuitry 904. Speakers 914 may be provided as integrated with other elements of each one of user equipment device 900 and user equipment device 901 or may be stand-alone units. The audio component of videos and other content displayed on display 912 may be played through the speakers 914. In some embodiments, the audio may be distributed to a receiver (not shown), which processes and outputs the audio via speakers 914.

The system for protecting and managing usage of user data for AI model training as described in FIGS. 1-8 may be implemented using any suitable architecture. For example, it may be a stand-alone system wholly-implemented on each one of user equipment device 900 and user equipment device 901. In such an approach, instructions of the system are stored locally (e.g., in storage 908), and data for use by the system is downloaded on a periodic basis (e.g., from an out-of-band feed, from an Internet resource, or using another suitable approach). Control circuitry 904 may retrieve instructions for the system from storage 908 and process the instructions to perform the protecting and managing usage of user data for AI model training. Based on the processed instructions, control circuitry 904 may determine what action to perform when input is received from user input interface 910. For example, movement of a cursor on a display up/down may be indicated by the processed instructions when user input interface 910 indicates that an up/down button was selected.

In some embodiments, the system protecting and managing usage of user data for AI model training is a client/server-based application. Data for use by a thick or thin client implemented on each one of user equipment device 900 and user equipment device 901 is retrieved on-demand by issuing requests to a server remote to each one of user equipment device 900 and user equipment device 901. In one example of a client/server-based guidance application, control circuitry 904 runs a web browser that interprets web pages provided by a remote server. For example, the remote server may store the instructions for AI model training system in a storage device. The remote server may process the stored instructions using circuitry (e.g., control circuitry 904) to perform the operations discussed in connection with FIGS. 1-8 and 11.

In some embodiments, the system for protecting and managing usage of user data for AI model training may be downloaded and interpreted or otherwise run by an interpreter or virtual machine (run by control circuitry 904). In some embodiments, the system for protecting and managing usage of user data for AI model training may be encoded in the ETV Binary Interchange Format (EBIF), received by the control circuitry 904 as part of a suitable feed, and interpreted by a user agent running on control circuitry 904. For example, the system for protecting and managing usage of user data for AI model training may be an EBIF application. In some embodiments, the system for protecting and managing usage of user data for AI model training may be defined by a series of JAVA-based files that are received and run by a local virtual machine or other suitable middleware executed by control circuitry 904. In some of such embodiments (e.g., those employing MPEG-2 or other digital media encoding schemes), the system for protecting and managing usage of user data for AI model training may be, for example, encoded and transmitted in an MPEG-2 object carousel with the MPEG audio and video packets of a program.

FIG. 10 shows illustrative devices and systems for protecting and managing usage of user data for AI model training, in accordance with some embodiments of this disclosure. User equipment devices 1007, 1008, 1010 (e.g., user device 101) may be coupled to communication network 1006. Communication network 1006 may be one or more networks including the Internet, a mobile phone network, mobile voice or data network (e.g., a 4G or LTE network), cable network, public switched telephone network, or other types of communication network or combinations of communication networks. Paths (e.g., depicted as arrows connecting the respective devices to the communication network 1006) may separately or together include one or more communications paths, such as a satellite path, a fiber-optic path, a cable path, a path that supports Internet communications (e.g., IPTV), free-space connections (e.g., for broadcast or other wireless signals), or any other suitable wired or wireless communications path or combination of such paths. Communications with the client devices may be provided by one or more of these communications paths but are shown as a single path in FIG. 10 to avoid overcomplicating the drawing.

Although communications paths are not drawn between user equipment devices, these devices may communicate directly with each other via communications paths as well as other short-range, point-to-point communications paths, such as USB cables, IEEE 1394 cables, wireless paths (e.g., Bluetooth, infrared, IEEE 702-11x, etc.), or other short-range communication via wired or wireless paths. The user equipment devices may also communicate with each other directly through an indirect path via communication network 1006.

System 1000 includes a media content source 1002 and a server 1004, which may comprise or be associated with database 1005. Communications with media content source 1002 and server 1004 may be exchanged over one or more communications paths but are shown as a single path in FIG. 10 to avoid overcomplicating the drawing. In addition, there may be more than one of each of media content source 1002 and server 1004, but only one of each is shown in FIG. 10 to avoid overcomplicating the drawing. If desired, media content source 1002 and server 1004 may be integrated as one source device.

In some embodiments, server 1004 may include control circuitry 1011 and a storage 1014 (e.g., RAM, ROM, Hard Disk, Removable Disk, etc.). Server 1004 may also include an input/output path 1012. I/O path 1012 may provide device information, or other data, over a local area network (LAN) or wide area network (WAN), and/or other content and data to the control circuitry 1011, which includes processing circuitry, and storage 1014. The control circuitry 1011 may be used to send and receive commands, requests, and other suitable data using I/O path 1012, which may comprise I/O circuitry. I/O path 1012 may connect control circuitry 1004 (and specifically processing circuitry) to one or more communications paths.

Control circuitry 1011 may be based on any suitable processing circuitry such as one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or super-computer. In some embodiments, control circuitry 1011 may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, the control circuitry 1011 executes instructions for an emulation system application stored in memory (e.g., the storage 1014). Memory may be an electronic storage device provided as storage 1014 that is part of control circuitry 1011.

Server 1004 may retrieve guidance data from media content source 1002, process the data as will be described in detail below, and forward the data to user equipment devices 1007, 1008 and 1010. Media content source 1002 may include one or more types of content distribution equipment including a TV distribution facility, cable system headend, satellite distribution facility, programming sources (e.g., TV broadcasters, such as NBC, ABC, HBO, etc.), intermediate distribution facilities and/or servers, Internet providers, on-demand media servers, and other content providers. NBC is a trademark owned by the National Broadcasting Company, Inc., ABC is a trademark owned by the American Broadcasting Company, Inc., and HBO is a trademark owned by the Home Box Office, Inc. Media content source 1002 may be the originator of content (e.g., a TV broadcaster, a Webcast provider, etc.) or may not be the originator of content (e.g., an on-demand content provider, an Internet provider of content of broadcast programs for downloading, etc.). Media content source 1002 may include cable sources, satellite providers, on-demand providers, Internet providers, over-the-top content providers, or other providers of content. Media content source 1002 may also include a remote media server used to store different types of content (including video content selected by a user), in a location remote from any of the client devices. Media content source 1002 may also provide metadata that can be used to identify important segments of media content as described above.

Client devices may operate in a cloud computing environment to access cloud services. In a cloud computing environment, various types of computing services for content sharing, storage or distribution (e.g., video sharing sites or social networking sites) are provided by a collection of network-accessible computing and storage resources, referred to as "the cloud." For example, the cloud can include a collection of server computing devices (such as, e.g., server 1004), which may be located centrally or at distributed locations, that provide cloud-based services to various types of users and devices connected via a network such as the Internet via communication network 1006. In such embodiments, user equipment devices may operate in a peer-to-peer manner without communicating with a central server.

FIG. 11 is flowchart of detailed illustrative process 1100 for protecting and managing usage of user data for AI model training (e.g., user device 106 of FIG. 1, user device 206 of FIG. 2, mobile device 302 of FIG. 3) in accordance with some embodiments of this disclosure. Process 1100 may be implemented at least in part by, for example, control circuitry 904 of FIG. 9, I/O path 902 (e.g., circuitry) of FIG. 9, and/or control circuitry 1011 of FIG. 10. In various embodiments, the individual steps of process 1100 may be implemented by one or more components of the devices and applications of FIGS. 1-10. Although the present disclosure may describe certain steps of process 1100 (and of other processes described herein) as being implemented by certain components of the devices and applications of FIGS. 1-10, this is for purposes of illustration only, and it should be understood that other components of the devices and systems of FIGS. 1-10 may implement those steps instead. In addition, one or more steps of process 1100 may be incorporated into or combined with one or more steps of any other process or embodiment.

In some embodiments, process 1100 begins at 1102, where the control circuitry (e.g., control circuitry 904 of FIG. 9 and/or control circuitry 1011 of FIG. 10, and/or I/O circuitry 902 or FIGS. 9 and/or 1012 of FIG. 10), monitors for receipt of data from an application of a plurality of applications installed on (or otherwise accessed via) a device. In some embodiments, the received data is associated with one or more interactions of a user with one or more applications accessed via a device (e.g., device 106 of FIG. 1. In some embodiments, the data received or collected and associated with user interactions does not include all data associated with every user interaction, but instead includes data, e.g., potentially private or personal data related to likewise select interactions, such as, for example, with one or more select applications.

In some implementations, process 1100 proceeds to 1104 where the control circuitry (and/or the I/O circuitry) determines whether data has been received from an application of a plurality of applications (e.g., Home Depot, Instagram, Spotify, shown in FIG. 1) installed on a device. In some embodiments, when the control circuitry determines that data has not been received from a particular application (e.g., Home Depot) of a plurality of applications installed on a device (e.g., 1104=No), process 1100 returns to 1102. In some implementations, when the control circuitry determines that data has been received from an application of a plurality of applications installed on a device (e.g., 1104=Yes), process 1100 proceeds to 1106. In some embodiments, at 1104, the control circuitry determines whether any new data has been mined at the device such as, for example, a user interface interaction has been received and tracked by the control circuitry.

In some embodiments, at 1106, the control circuitry stores the received data, in association with the application the data was received from, in a database comprising data corresponding to user interface interactions with the plurality of applications (e.g., training database 102*a* of FIG. 1), in memory (e.g., non-transitory memory 908 of FIG. 9, or storage 1014 of FIG. 10). In some implementations, at 1108, the control circuitry calculates a plurality of model weights for an AI model based on the data stored in the database. In some implementations, the control circuitry stores the plurality of model weights in a weight database or database in the memory and/or provides the plurality of model weights to the AI model. It should be appreciated that 1102 may be a continual or continuous ongoing iterative process where user interactions are continually or continuously monitored, stored, and used to calculate weights (e.g., W1, W2, W3, and W4 of FIG. 1) and/or adjust or update model weights for an AI model. In some embodiments, 1102-1108 may be performed in relation to one or more interactions with a singular application and in relation to one or more model weights.

In some embodiments, at 1110, the control circuitry monitors for an input via a user interface of the user device to modify the database (e.g., deletion of an application, manual deletion of data from the database via a control panel, replace stored data with more accurate data, add new data to database, or any other suitable input, or any suitable combination thereof). In some implementations, at 1112, the control circuitry determines whether an input has been received via the user interface of the user device to remove a subset of the stored data from the database. In some embodiments, when the control circuitry determines an input has not been received via the user interface of the user device to remove a subset of the stored data from the database (e.g., 1112=No), process 1100 returns to 1110. In some implementations, when the control circuitry determines an input has been received via the user interface of the user device to remove a subset of the stored data from the database (e.g., 1112=Yes), process 1100 proceeds to 1114. In some embodiments, the subset of the stored data corresponds to any of data associated with an application of the plurality of applications, data selected via the user interface of the device, or any other suitable subset of data. In some embodiments, the subset of the stored data may alternatively be referred to as at least a portion of the stored data, a subset of the data, or one or more portions of the data, or one or more portions of the stored data.

In some embodiments, at 1114, the control circuitry analyzes the plurality of model weights (e.g., the model weights calculated for the AI model) to identify one or more model weights that were calculated based on a portion of the subset of the stored data from the database. In some implementations, at 1116, the control circuitry identifies an activity associated with the one or more model weights. For example, in some embodiments, the activity associated with the identified one or more weights comprises making predictions or classifications based on the model weight, such as recommending a product in an e-commerce application or generating a text response in a chatbot. In some embodiments, at 1118, the control circuitry suspends the activity associated with the identified one or more model weights. In some implementations, by suspending these activities, the system ensures that outputs are not influenced by data that the user has requested to be forgotten. In some implementations, at 1120, the control circuitry determines whether or not resources available to the device exceed a threshold (e.g., if the device is plugged into or wirelessly connected to a power source, if the battery of the device is above a charge percentage, if the device is in a sleep state, and/or any other suitable factor). For example, when on battery power, the device may perform the fine tuning or retraining of the AI model (e.g., by recalibrating or adjusting one or more model parameters) when the device is connected to a power source, e.g., recalibration and model parameters may be adjusted and the actual retraining or fine tuning processing may be performed when a plugged in.

In some embodiments, if the control circuitry determines that resources available to the device do not exceed the threshold (e.g., 1120=No), process 1100 proceeds to 1122, where the control circuitry adjusts one or more parameters (e.g., weights or biases) of the AI model based on an estimation of required changes. In some implementations, at 1124, the control circuitry resumes the activity (e.g., providing output of content via an application) that had been suspended, with the activity now based at least in part on the adjusted parameters (e.g., having previously been based on the one or more model weights), and process 1100 then returns to 1120. In some embodiments, when the control circuitry determines that resources available to the device exceed the threshold (e.g., 1120=Yes), process 1100 proceeds to 1126, where the control circuitry suspends the activity associated with one of the one or more model weights or the one or more adjusted parameters.

In some embodiments, at 1128, the control circuitry removes the subset of the stored data from the database. In some implementations, at 1130, the control circuitry calculates one or more adjusted model weights to replace the one or more model weights (e.g., calculates the one or more adjusted model weights based on the data remaining in the database). In some implementations, at 1132, the control circuitry provides the one or more adjusted model weights to the AI model. In some embodiments, the control circuitry stores the one or more adjusted model weights in the weight database in addition to or in place of the one or more model weights (e.g., calculated at 1108). At 1134, the control circuitry resumes the activity that had been suspended, with the activity now based on the one or more adjusted model weights.

The processes discussed above are intended to be illustrative and not limiting. One skilled in the art would appreciate that the steps of the processes discussed herein may be omitted, modified, combined and/or rearranged, and any additional steps may be performed without departing from the scope of the invention. More generally, the above disclosure is meant to be illustrative and not limiting. Only the claims that follow are meant to set bounds as to what the present invention includes. Furthermore, it should be noted that the features described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods. Throughout the specification the phrases “in response to” and “based on” shall be understood to have a broad meaning unless context requires otherwise. For example, “in response to” can refer to a step that is in direct or indirect response to a prior step, and “based on” can refer to a step that is based at least in part on a prior step.

What is claimed is:

1. A method comprising:

receiving data associated with interactions of a user with a plurality of applications accessed via a device;

storing the data in a database;

calculating a plurality of model weights for an artificial intelligence (AI) model based at least in part on the stored data;

based at least in part on input received via a user interface of the device to remove a subset of the stored data from the database:

identifying a subset of model weights from the plurality of model weights, wherein the subset of model weights is associated with the subset of the stored data;

modifying the stored data by removing the subset of the stored data from the database, wherein the subset of the stored data is based on interactions of the user with an application of the plurality of applications;

calculating adjusted model weights for the subset of model weights based at least in part on the modified stored data; and using the AI model with the adjusted model weights to provide an output based on input data associated with a subsequent interaction of the user.

2. The method of claim 1, wherein:

the calculating the plurality of model weights comprises training the AI model based at least in part on the stored data; and the calculating the adjusted model weights comprises at least one of fine-tuning or retraining the AI model based at least in part on the modified stored data.

3. The method of claim 2, wherein at least one of the training, fine-tuning, or retraining the AI model is performed at each of the device and a remote server.

4. The method of claim 2, further comprising:

determining that an amount of resources available for the device is below a threshold; and at a later time, based at least in part on determining that the amount of resources available for the device now exceeds the threshold, retraining the AI model by recalibrating or adjusting one or more model parameters based at least in part on the modified stored data.

5. The method of claim 2, wherein:

a respective application of the plurality of applications is associated with a respective data type of a plurality of data types;

the plurality of data types respectively correspond to a plurality of training templates, each training template being structured based at least in part on its corresponding data type;

the application, associated with the subset of the stored data, is associated with a particular training template and a particular data type;

the stored data is organized based at least in part on the plurality of training templates; and the method further comprises identifying the subset of the stored data from the database for removal based at least in part on identifying data in the database associated with the particular training template and the particular data type associated with the application.

6. The method of claim 1, further comprising:

associating metadata with the stored data, to indicate one or more applications of the plurality of applications to which the stored data was collected in relation to; and removing the subset of the stored data from the database based at least in part on the associated metadata.

7. The method of claim 1, further comprising:

mapping a plurality of memory regions to the respective model weights; and identifying one or more model weights of the calculated plurality of model weights that corresponds to data collected based at least in part on interactions associated with the application, wherein the one or more model weights are mapped to one or more memory regions of the plurality of memory regions, wherein modifying the stored data comprises removing the mapping between the one or more model weights and the one or more memory regions and deleting the one or more model weights from the stored data.

8. The method of claim 1, further comprising:

receiving additional data associated with one or more interactions of the user with at least one of the plurality of applications;

determining whether the additional data matches a portion of the stored data; and based at least in part on determining that the additional data matches a portion of the stored data, refraining from storing the additional data and refraining from using the additional data to calculate the plurality of model weights.

9. The method of claim 1, wherein:

the input received via the user interface of the device comprises receiving a request to uninstall the application; and the subset of the stored data was collected by tracking interactions with the application received via the user interface.

10. The method of claim 9, further comprising:

based at least in part on the request to uninstall the application, providing, at the user interface on the device, a selectable option to remove the subset of the stored data related to the application from the database; and wherein the input further comprises a user interface selection of the selectable option to remove the data associated with the application from the database.

11. The method of claim 9, the method further comprising:

providing, at the user interface of the device, an indication that the interactions with the application received via the user interface of the device are being tracked for use in the training of the AI model.

12. The method of claim 9, wherein the tracking the interactions with the application received via the user interface further comprises:

accessing a tracking setting of the device, wherein the tracking setting indicates one or more conditions under which collected data is permitted to be used for the AI model;

determining a status of the device of the user;

comparing the status of the device of the user to the tracking setting; and based at least in part on the comparison of the status of the device of the user to the tracking setting, storing the data in the database.

13. The method of claim 1, wherein the storing the data in the database is based at least in part on receiving an approval input via the user interface of the device, wherein the approval input comprises user consent to the data being stored, and wherein the method further comprises generating a plurality of user consent tokens for respective applications for which the user consent is received.

14. The method of claim 13, wherein storing the data in the database further comprises:

transferring a portion of the received data to a buffer;

determining whether a request not to use the portion of the received data in relation to the AI model is received within a threshold period of time from the transferring; and based at least in part on determining that the request has not been received within the threshold period of time and at least a portion of a consent token of the plurality of user consent tokens indicates that the portion of the received data may be provided to the database, providing the portion of the received data from the buffer to the database to be included in the stored data.

15. The method of claim 1, further comprising:

monitoring device activity to determine available resources for the device; and wherein at least one of the storing the data in the database, the calculating the plurality of model weights, the modifying the stored data, or the calculating the adjusted model weights is performed based at least in part on determining that the available resources for the device exceed a threshold.

16. The method of claim 1, wherein the storing the data in the database comprises anonymizing the stored data by adding random noise to the stored data.

17. A system comprising:

control circuitry configured to:

receive data associated with interactions of a user with a plurality of applications accessed via a device;

memory configured to:

store the data in a database;

wherein the control circuitry is further configured to:

calculate a plurality of model weights for an artificial intelligence (AI) model based at least in part on the stored data;

based at least in part on input received via a user interface of the device to remove a subset of the stored data from the database:

identify a subset of model weights from the plurality of model weights, wherein the subset of model weights is associated with the subset of the stored data;

modify the stored data by removing the subset of the stored data from the database, wherein the subset of the stored data is based on interactions of the user with an application of the plurality of applications;

calculate adjusted model weights for the subset of model weights based at least in part on the modified stored data; and cause the AI model with the adjusted model weights to provide an output based on input data associated with a subsequent interaction of the user.

18. The system of claim 17, wherein the control circuitry is further configured to:

calculate the plurality of model weights by training the AI model based at least in part on the stored data; and calculate the adjusted model weights by at least one of fine-tuning or retraining the AI model based at least in part on the modified stored data.

19. The system of claim 18, wherein at least one of the training, fine-tuning, or retraining the AI model is performed at each of the device and a remote server.

20. The system of claim 18, wherein the control circuitry is further configured to:

determine that an amount of resources available for the device is below a threshold; and at a later time, based at least in part on determining that the amount of resources available for the device now exceeds the threshold, retrain or fine-tune the AI model by recalibrating or adjusting one or more model parameters based at least in part on the modified stored data.

* * * * *